US011177614B2

(12) United States Patent
Guetig et al.

(10) Patent No.: US 11,177,614 B2
(45) Date of Patent: Nov. 16, 2021

(54) TRANSCEIVER ASSEMBLY ARRAY WITH FIXED HEATSINK AND FLOATING TRANSCEIVERS

(71) Applicant: Samtec, Inc., New Albany, IN (US)

(72) Inventors: Keith R. Guetig, New Albany, IN (US); Thomas A. Hall, III, New Albany, IN (US); Andrew R. Collingwood, New Albany, IN (US); John L. Nightingale, New Albany, IN (US); Eric J. Zbinden, New Albany, IN (US)

(73) Assignee: SAMTEC, INC., New Albany, IN (US)

(*) Notice: Subject to any disclaimer, the term of this patent is extended or adjusted under 35 U.S.C. 154(b) by 0 days.

(21) Appl. No.: 16/619,246

(22) PCT Filed: Jun. 6, 2018

(86) PCT No.: PCT/US2018/036223
§ 371 (c)(1),
(2) Date: Dec. 4, 2019

(87) PCT Pub. No.: WO2018/226805
PCT Pub. Date: Dec. 13, 2018

(65) Prior Publication Data
US 2020/0153163 A1 May 14, 2020

Related U.S. Application Data

(60) Provisional application No. 62/516,533, filed on Jun. 7, 2017, provisional application No. 62/535,355, filed on Jul. 21, 2017.

(51) Int. Cl.
*H01R 13/631* (2006.01)
*H01R 13/26* (2006.01)
*H01R 13/52* (2006.01)

(52) U.S. Cl.
CPC .......... *H01R 13/631* (2013.01); *H01R 13/26* (2013.01); *H01R 13/5205* (2013.01)

(58) Field of Classification Search
CPC ... H01R 13/631; H01R 13/26; H01R 13/5205
(Continued)

(56) References Cited

U.S. PATENT DOCUMENTS 4,770,645 A 9/1988 Antes
5,201,663 A * 4/1993 Kikuchi ............. H01R 13/6315
439/83
(Continued)

FOREIGN PATENT DOCUMENTS

CN 202308382 U 7/2012
CN 204666874 U 9/2015
(Continued)

OTHER PUBLICATIONS

Official Communication issued in corresponding Chinese Patent Application No. 201880037699.5, dated Sep. 21, 2020.
(Continued)

*Primary Examiner* — Alexander Gilman
(74) *Attorney, Agent, or Firm* — Keating & Bennett, LLP

(57) ABSTRACT

A cage assembly includes a cage including a top wall and a bottom wall and an electrical receptacle positioned between the top wall and the bottom wall such that the electrical receptacle floats within the cage in opposite directions between the top wall and the bottom wall.

20 Claims, 35 Drawing Sheets

(58) Field of Classification Search
USPC ........................................................ 439/337
See application file for complete search history.

(56) References Cited

U.S. PATENT DOCUMENTS

| | | | |
|---|---|---|---|
| 5,666,264 A * | 9/1997 | Chandler | G06F 1/18 |
| | | | 361/679.6 |
| 6,304,436 B1 | 10/2001 | Branch et al. | |
| 6,793,400 B2 | 9/2004 | Massey et al. | |
| 6,986,679 B1 | 1/2006 | Aronson et al. | |
| 7,377,804 B2 | 5/2008 | Lin | |
| 8,353,708 B2 | 1/2013 | Hsu | |
| 8,435,052 B2 | 5/2013 | Potters | |
| 8,449,203 B2 | 5/2013 | Downs | |
| 8,556,658 B2 * | 10/2013 | Szczesny | G02B 6/4278 |
| | | | 439/607.2 |
| 8,588,561 B2 | 11/2013 | Zbinden et al. | |
| 8,613,632 B1 * | 12/2013 | Nichols | H01R 13/6587 |
| | | | 439/607.21 |
| 8,885,342 B2 | 11/2014 | Skepnek et al. | |
| 8,939,794 B2 * | 1/2015 | Mason | H01R 13/6275 |
| | | | 439/581 |
| 9,042,096 B2 * | 5/2015 | Thomas | H04L 1/00 |
| | | | 361/688 |
| 9,274,295 B2 | 3/2016 | Droesbeke | |
| 9,281,597 B2 * | 3/2016 | Hashiguchi | H01R 12/774 |
| 9,325,100 B2 | 4/2016 | Hirschy | |
| 9,391,407 B1 * | 7/2016 | Bucher | H01R 13/659 |
| 9,402,332 B2 * | 7/2016 | McKervey | H05K 7/20409 |
| 9,488,795 B1 * | 11/2016 | Lane | G02B 6/3897 |
| 9,531,117 B1 * | 12/2016 | Yang | H01R 13/506 |
| 9,620,906 B1 | 4/2017 | Briant et al. | |
| 9,660,364 B2 * | 5/2017 | Wig | H04B 1/3883 |
| 9,666,997 B1 * | 5/2017 | Henry | H01R 13/6583 |
| 9,705,258 B2 * | 7/2017 | Phillips | H01R 13/74 |
| 9,728,919 B1 * | 8/2017 | Dunwoody | H01R 13/6582 |
| 9,735,484 B2 | 8/2017 | Brubaker et al. | |
| 9,846,287 B2 | 12/2017 | Mack | |
| 9,910,231 B2 * | 3/2018 | Kelty | G02B 6/4269 |
| 9,924,615 B2 | 3/2018 | Bucher | |
| 10,114,182 B2 * | 10/2018 | Zbinden | G02B 6/4268 |
| 10,135,211 B2 | 11/2018 | Lloyd et al. | |
| 10,295,767 B2 | 5/2019 | Chen et al. | |
| 10,306,806 B2 | 5/2019 | Hall, III et al. | |
| 10,368,464 B2 | 7/2019 | Chen et al. | |
| 10,375,859 B2 | 8/2019 | Wanha | |
| 10,581,205 B2 * | 3/2020 | Yang | H01R 13/6594 |
| 10,797,451 B2 * | 10/2020 | Regnier | H01R 25/006 |
| 2006/0291171 A1 * | 12/2006 | Ahrens | G02B 6/4292 |
| | | | 361/716 |
| 2007/0232127 A1 | 10/2007 | Lin | |
| 2009/0239396 A1 | 9/2009 | Tay et al. | |
| 2011/0164382 A1 * | 7/2011 | Pirillis | H01R 13/6586 |
| | | | 361/690 |
| 2012/0052720 A1 * | 3/2012 | David | H01R 13/6595 |
| | | | 439/487 |
| 2012/0058670 A1 * | 3/2012 | Regnier | H01R 12/00 |
| | | | 439/485 |
| 2012/0182688 A1 * | 7/2012 | McColloch | G02B 6/4269 |
| | | | 361/692 |
| 2012/0257355 A1 * | 10/2012 | Yi | G02B 6/4269 |
| | | | 361/704 |
| 2012/0262888 A1 | 10/2012 | Liu | |
| 2013/0034999 A1 | 2/2013 | Szczesny et al. | |
| 2013/0114211 A1 * | 5/2013 | Regnier | G02B 6/4201 |
| | | | 361/704 |
| 2014/0030922 A1 * | 1/2014 | Schmitt | H01R 13/6587 |
| | | | 439/607.2 |
| 2014/0041937 A1 * | 2/2014 | Lloyd | H05K 1/0243 |
| | | | 174/74 R |
| 2014/0153192 A1 | 6/2014 | Neer et al. | |
| 2014/0187087 A1 | 7/2014 | Mason et al. | |
| 2015/0029667 A1 | 1/2015 | Szczesny | |
| 2015/0155670 A1 * | 6/2015 | Gardner | H01R 13/5208 |
| | | | 439/587 |
| 2015/0378116 A1 | 12/2015 | Zbinden et al. | |
| 2016/0106001 A1 * | 4/2016 | Wanha | H01L 23/3675 |
| | | | 165/80.4 |
| 2016/0211624 A1 * | 7/2016 | Long | H01R 13/6587 |
| 2016/0218455 A1 * | 7/2016 | Sayre | H01R 13/6594 |
| 2016/0238808 A1 * | 8/2016 | Faw | G02B 6/4246 |
| 2017/0077643 A1 | 3/2017 | Zbinden et al. | |
| 2019/0025529 A1 | 1/2019 | Chen et al. | |
| 2019/0146167 A1 | 5/2019 | Leigh et al. | |
| 2019/0288422 A1 | 9/2019 | Champion et al. | |
| 2020/0153163 A1 * | 5/2020 | Guetig | H01R 13/6582 |

FOREIGN PATENT DOCUMENTS

| | | |
|---|---|---|
| CN | 106471681 A | 3/2017 |
| JP | 2008-090091 A | 4/2008 |
| TW | 199239 B | 2/1993 |
| TW | 200421676 A | 10/2004 |
| TW | 200501515 A | 1/2005 |
| WO | 2017/044825 A1 | 3/2017 |

OTHER PUBLICATIONS

Official Communication issued in Taiwanese Patent Application No. 10920400940, dated Apr. 29, 2020.
Official Communication issued in International Patent Application No. PCT/US2018/036223, dated Sep. 21, 2018.
Chen et al., "Spoiler Heat Sink Device in Belly-To-Belly Transceiver", U.S. Appl. No. 62/534,847, filed Jul. 20, 2017.
Park et al., "OSFP Octal Small Form Factor Pluggable Module," Rev. 1.0, Mar. 17, 2017, pp. 1-53.
Zbinden et al., "Rack-Mountable Equipment With a High-Heat-Dissipation Module, and Transceiver Receptacle With Increased Cooling", U.S. Appl. No. 16/687,891, filed Nov. 19, 2019.
Official Communication issued in corresponding Canadian Patent Application No. 3,066,003, dated Feb. 11, 2021.
Official Communication issued in corresponding European Patent Application No. 18813597.4, dated Feb. 5, 2021.

* cited by examiner

TRANSCEIVER ASSEMBLY ARRAY WITH FIXED HEATSINK AND FLOATING TRANSCEIVERS

BACKGROUND OF THE INVENTION

1. Field of the Invention

The present invention relates to transceiver assemblies. More specifically, the present invention relates to a transceiver assembly in which a transceiver and a transceiver receptacle float within a cage.

2. Description of the Related Art

FIG. 1 shows a known transceiver assembly 100. As shown in FIG. 1, a transceiver 110 is plugged into a high-speed input/output (I/O) port that is included in a faceplate 190 and that includes a transceiver receptacle 120 located in the rear of a cage 130. The cage 130 is mounted to a carrier or host printed circuit board (PCB) 140. A heatsink 150 is attached to the top of the cage 130. The heatsink 150 provides convective cooling by air flowing over the heatsink 150. The transceiver assembly 100 could be used with known connector module standards, including, Small Form-factor Pluggable (SFP), Quad Small Form-factor Pluggable (QSFP), Quad Small Form-factor Pluggable Double Density (QSFP-DD), Octal Small Form-factor Pluggable (OSFP), C Form-factor Pluggable (CFP), 100 Form-factor Pluggable (CXP), 400 Form-factor Pluggable (CDFP), etc. OSFP connector modules include a heatsink that includes short fins and that is integral with the upper shell of the connector module, which is a distinguishing feature of the QSFP family of products. The heatsink of the OSFP connector modules has limited heat dissipation capacity because the fins of the heatsink are short.

As indicated by the vertical two-way arrow in FIG. 1, the heatsink 150 on top of the cage 130 floats up and down to allow for varying thicknesses in the transceiver 110 and/or cage 130.

FIG. 2 shows a plan view of a row of transceiver assemblies 200 mounted on a line card 240, but without the heatsinks, as is known in the art. As shown in FIG. 2, the transceivers 210 are each plugged into a cage 230. As shown in FIG. 3, each cage 230 includes a transceiver receptacle 220.

FIG. 3 shows a sectional view along line A-A in FIG. 2. FIG. 3 shows varying gaps between the tops of the transceivers 210 and the tops of the cages 230, with the exception of the cage 230 on the far right-hand side of FIG. 3 that does not include a transceiver 210, but instead shows a transceiver receptacle 220 inside of the cage 230. The size of the gaps vary because of manufacturing tolerances in the transceivers 210 and/or the cage 230. The nominal gap is 0.40 mm, and the gaps vary from 0.25 mm to 0.65 mm. Gaps are a consideration because the tops of the transceivers 210 should touch the bottoms of respective heatsinks 250 over the largest available common surface area between the transceiver 210 and the heatsink 250 to transfer the maximum amount of heat from the transceiver 210 to the heatsink 250. If a gap is present between the top wall or top surface of the transceiver 210 and the immediately adjacent bottom wall or bottom surface of the heatsink 250, then heat dissipation from the transceiver 210 to the heatsink 250 is not maximized, particularly in applications where the heatsink 250 is statically mounted (i.e., does not float) to the cage 250.

FIG. 4 shows a known cage assembly 405 mounted on a carrier PCB 440. The cage assembly 405 includes a cage 430 with a heatsink 450, a transceiver receptacle (not shown) within the cage 430, and a cable connector 412 extending from the rear of the cage 430, i.e., the side opposite of the opening 490 into which the transceiver is inserted. A transceiver can be plugged into the opening 490 in the cage 430. FIG. 4 shows a first connector 420 connected to a first group of cables 415 and a second connector 425 connected to a second group of cables 415. The first connector 420 and second connector 425 can be connected to PCB locations spaced away from the cage 430.

FIG. 5 shows a rack-mountable transceiver assembly array 505 known in the art. FIG. 5 shows an array of transceiver assemblies 500 plugged into an array of cage assemblies 530.

Thermal management is a problem with known transceiver assembly arrays. The known transceivers are typically part of an active optical cable (AOC). The transceiver includes active optical components, including, for example, optical-to-electrical (O-E) components and/or electrical-to-optical (E-O) components, that generate heat. The heatsinks included with the known cage assemblies do not always provide adequate thermal management of the heat generated by the active optical components. Additionally, forced airflow or convective cooling provided by the heatsinks is not enough for the AOCs to operate properly.

Active cooling, e.g., via a cold plate, a heat pipe, etc., can provide suitable thermal management. But using a common cold plate or a heat pipe requires that the top of all transceivers be on the same datum plane to ensure that each transceiver is in proper contact with the common cold plate or heat pipe.

SUMMARY OF THE INVENTION

To overcome the problems described above, preferred embodiments of the present invention provide a transceiver assembly and a cage assembly in which a transceiver and an associated transceiver receptacle within the cage are allowed to both float such that a top of the transceiver can be engaged with a single, monolithic heatsink by being aligned with a common datum plane.

Preferred embodiments of the present invention also provide a transceiver assembly and a cage assembly in which contact pads are on the bottom of the transceiver PCB, which allows the transceiver to engage with a compression connector at the bottom of the cage assembly, rather than an edge card connector, and which in turn allows the transceiver to be pushed against a fixed heat exchanger.

According to a preferred embodiment of the present invention, a cage assembly includes a cage including a top wall and a bottom wall and an electrical receptacle positioned between the top wall and the bottom wall such that the electrical receptacle floats within the cage in opposite directions between the top wall and the bottom wall.

The cage assembly further preferably includes an intermediate substrate on which the electrical receptacle is mounted. The intermediate substrate preferably floats within the cage in the opposite directions between the top wall and the bottom wall.

Preferably, the cage assembly further includes arms extending from the bottom wall, and at least one of the arms is arranged to engage a bottom surface of a transceiver when the transceiver is inserted into the cage assembly. At least one of the arms is preferably arranged to engage a bottom surface of the intermediate substrate.

Preferably, the cage assembly further includes a heat exchanger fixed to the top wall of the cage, and a top surface area of a transceiver is biased towards a bottom surface of the heat exchanger when the transceiver is inserted into the cage assembly. The top surface area of the transceiver preferably contacts the bottom surface of the heat exchanger through an opening in the cage when the transceiver is inserted into the cage assembly.

The cage assembly further preferably includes a compression connector. Contacts of the compression connector preferably allow the intermediate substrate to float in a direction between the top wall and the bottom wall. The cage preferably includes a stop that engages the intermediate substrate to ensure that a contact of the compression connector maintains electrical connection to the intermediate substrate.

The cage preferably includes at least one guide that allows the electrical receptacle to float in a direction between the top wall and the bottom wall. The at least one guide preferably engages with a groove in the intermediate substrate. Preferably, the cage assembly further includes a grommet that connects cables to the electrical receptacle, and the at least one guide engages with a slot in the grommet.

The cage assembly preferably further includes cables connected to the electrical receptacle.

According to a preferred embodiment of the present invention, a transceiver assembly includes the cage assembly according to one of the various preferred embodiments of the present invention on a substrate and a transceiver inserted into the cage assembly.

Preferably, the transceiver is inserted into the electrical receptacle, and the transceiver floats within the cage in the opposite directions between the top wall and the bottom wall. The transceiver is preferably inserted into the electrical receptacle and the transceiver is biased towards the top wall. Preferably, the transceiver assembly further includes a heat exchanger fixed to the top wall of the cage, and a top surface area of the transceiver is biased towards a bottom surface of the heat exchanger when the transceiver is plugged into the cage assembly.

According to a preferred embodiment of the present invention, a cage assembly array includes an array of cage assemblies, each of the cage assemblies being defined by the cage assembly of one of various preferred embodiments of the present invention and a heat exchanger in thermal contact with each cage assembly in the array of cage assemblies.

The heat exchanger preferably is an active heat exchanger or a passive heat exchanger. The array of cage assemblies preferably define a common datum plane with respect to the heat exchanger. The common datum plane preferably includes an opening of each cage assembly.

According to a preferred embodiment of the present invention, a transceiver assembly array includes the cage assembly array of one of the various preferred embodiments of the present invention and transceivers inserted into cage assemblies of the cage assembly array.

According to a preferred embodiment of the present invention, a cage assembly includes a cage and a compression member positioned at a bottom of the cage and surrounded by the cage such that, when a transceiver is inserted into the cage, the transceiver is forced toward a top of the cage.

The cage assembly further preferably includes at least one spring that engages a bottom surface of the transceiver when the transceiver is inserted into the cage assembly. The cage assembly further preferably includes at least one arm that engages a bottom surface of the transceiver when the transceiver is inserted into the cage assembly. Preferably, the cage assembly further preferably includes a heat exchanger, and a top surface of the transceiver is biased towards a bottom surface of the heat exchanger when the transceiver is inserted into the cage assembly. The compression member preferably is a compression connector.

According to a preferred embodiment of the present invention, a transceiver assembly includes the cage assembly of one of the various preferred embodiments of the present invention on a substrate and a transceiver inserted into the cage assembly.

Contacts of the compression member are preferably directly connected to contact pads on a transceiver PCB in the transceiver and are directly connected to the substrate.

According to a preferred embodiment of the present invention, a cage assembly array includes the array of cage assemblies of one of the various preferred embodiments of the present invention on a substrate and a heat exchanger in thermal contact with each cage assembly in the array of cage assemblies.

The heat exchanger preferably is an active heat exchanger or a passive heat exchanger. The array of cage assemblies preferably defines a common datum plane with respect to the heat exchanger. The common datum plane preferably includes an opening of each cage assembly.

According to a preferred embodiment of the present invention, a transceiver assembly array includes the cage assembly array of one of the various preferred embodiments of the present invention and transceivers inserted into cage assemblies of the cage assembly array.

According to a preferred embodiment of the present invention, an electrical connector includes a compression connector, a PCB electrically connected to the compression connector, and a receptacle connector electrically connected to the PCB. The PCB and the receptacle connector move together in first and second directions, and both the PCB and the receptacle connector are biased in the first direction.

According to a preferred embodiment of the present invention, a cage assembly array includes a common heatsink and cages. Each cage includes an opening on a top surface through which a top surface of a transceiver and the bottom surface of the common heatsink can be in direct contact when a transceiver is inserted into the cage, an electrical connector that freely floats towards and away from the common heatsink and that engages with the transceiver, and at least one biasing member that biases the transceiver against the common heatsink when the transceiver is inserted into the cage.

One of the at least one biasing members preferably is a compression connector that also provides electrical contact to the transceiver.

According to a preferred embodiment of the present invention, a transceiver assembly array includes the cage assembly array of one of the various preferred embodiments of the present invention on a substrate and the transceiver inserted into one of the cages.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
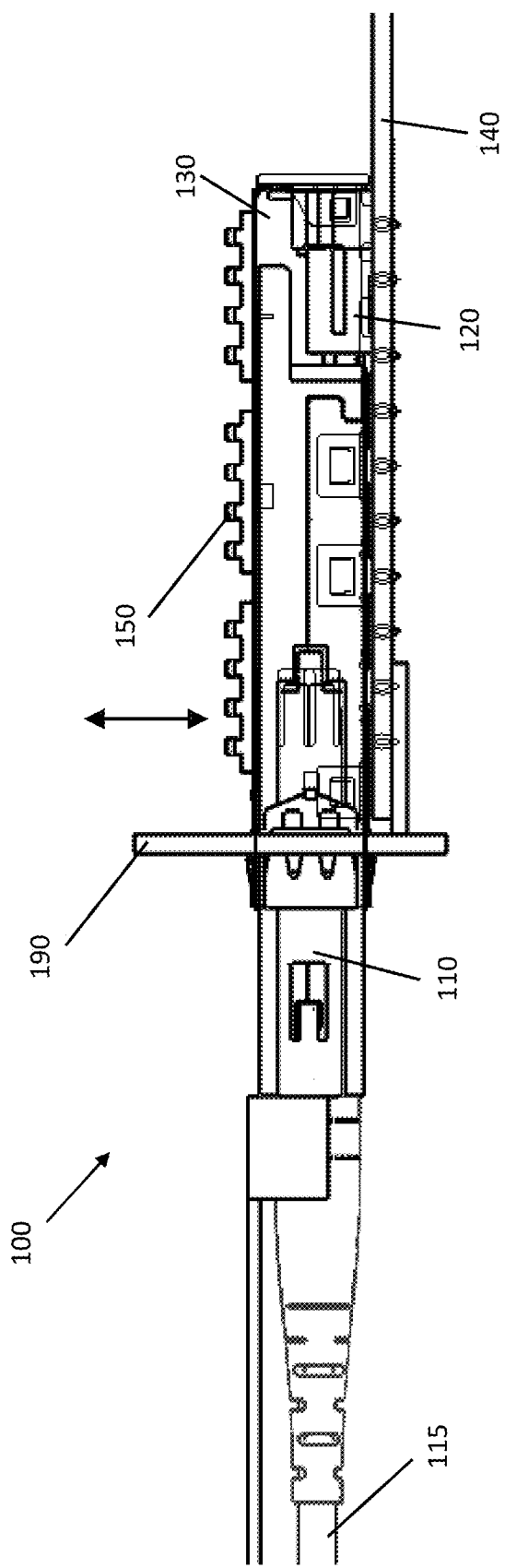
FIG. 1 is a cross-sectional view of a known transceiver assembly with a floating heatsink and a fixed connector.
Figure 2:
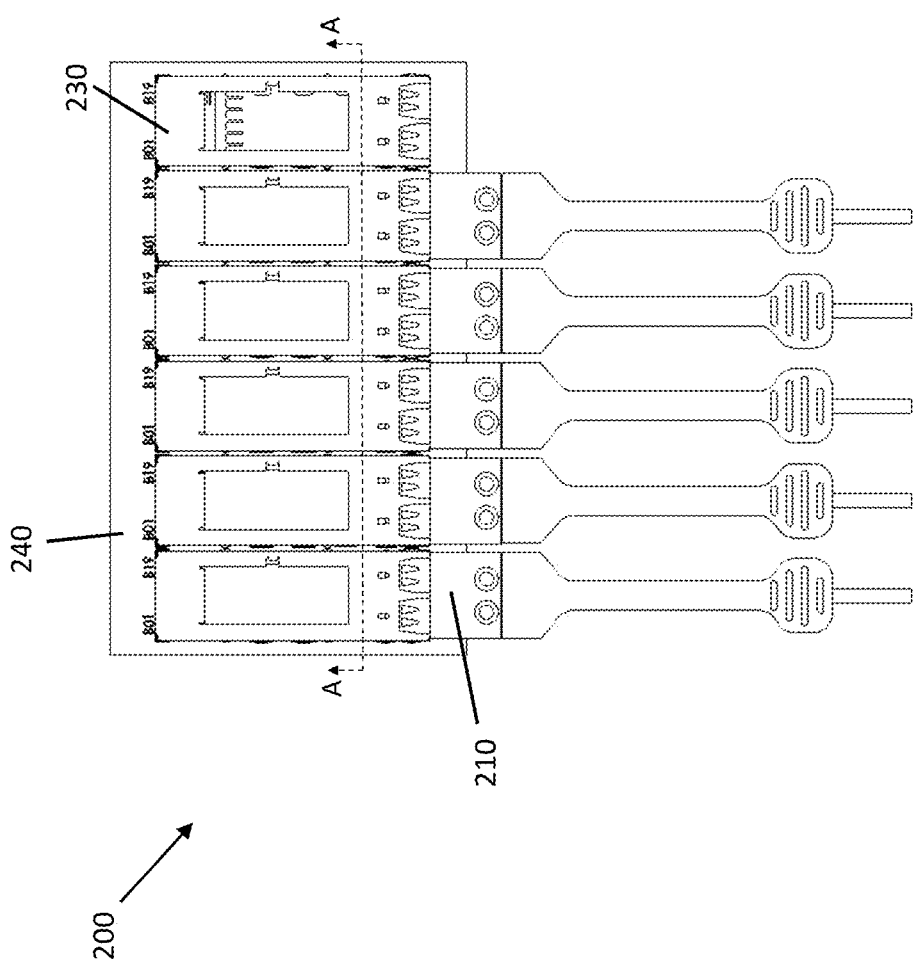
FIG. 2 is a top view of a known transceiver assembly array.
Figure 3:
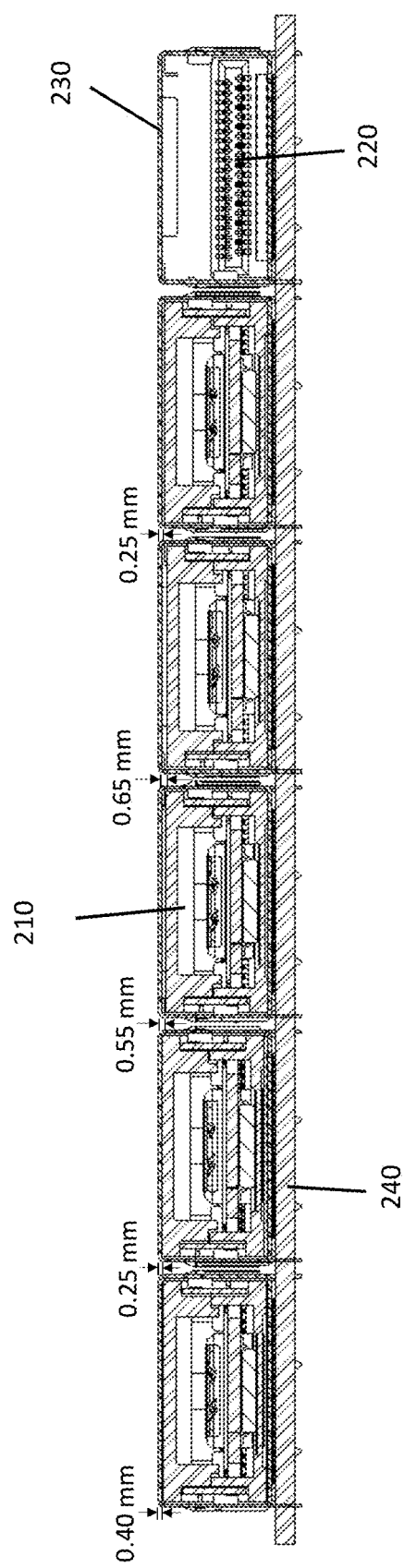
FIG. 3 is a front sectional view of the known transceiver array shown in FIG. 2 along line A-A.
Figure 4:
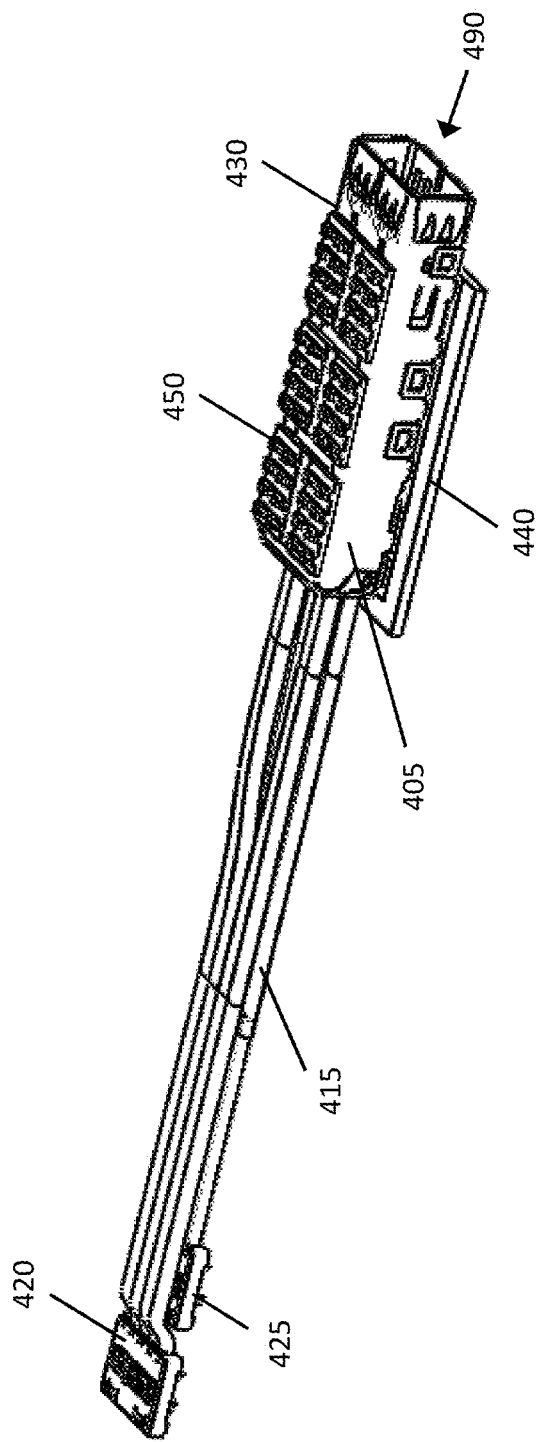
FIG. 4 is a perspective view of a known cage assembly.
Figure 5:
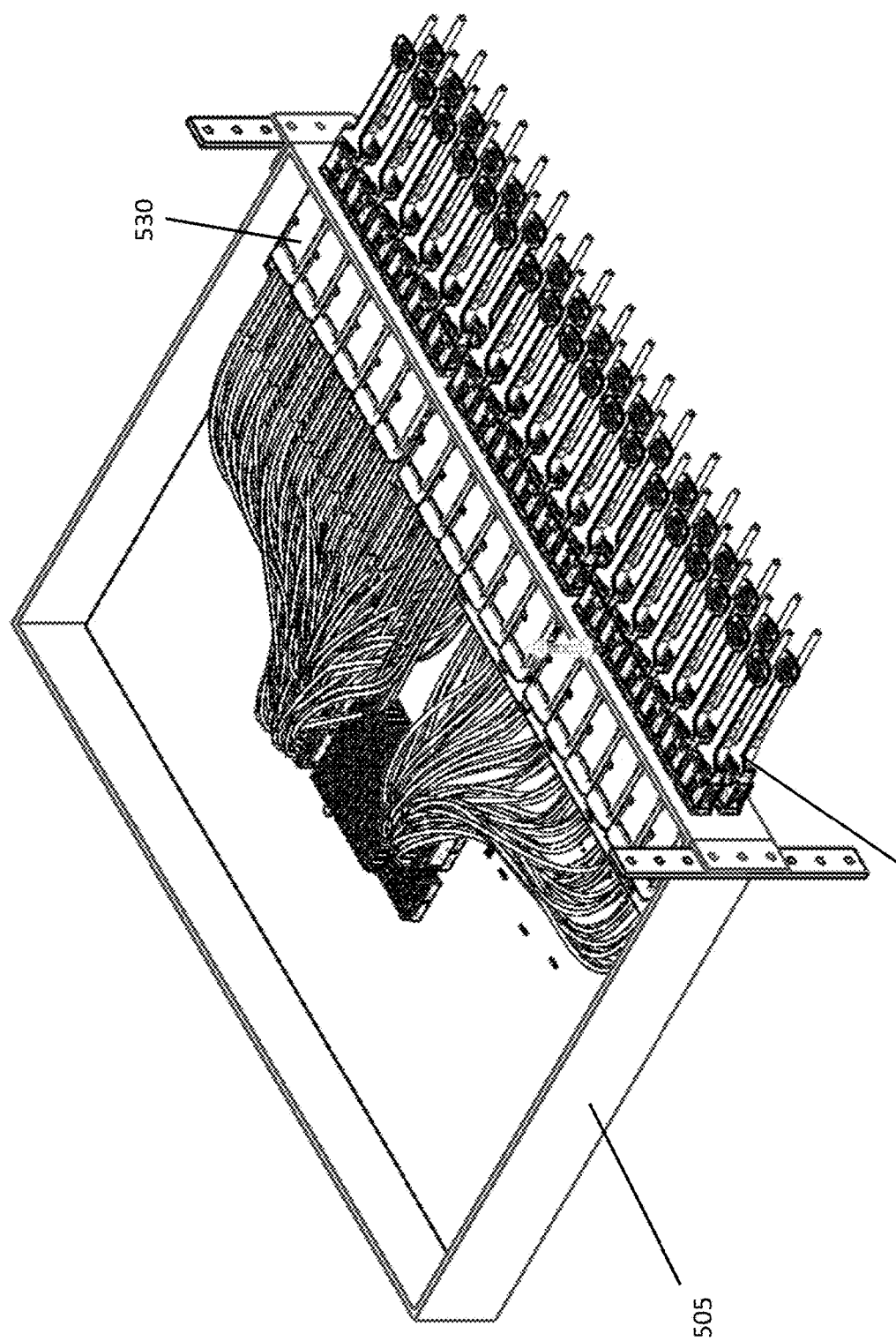
FIG. 5 is a sectional view of a known rack-mountable transceiver assembly array.
Figure 6:
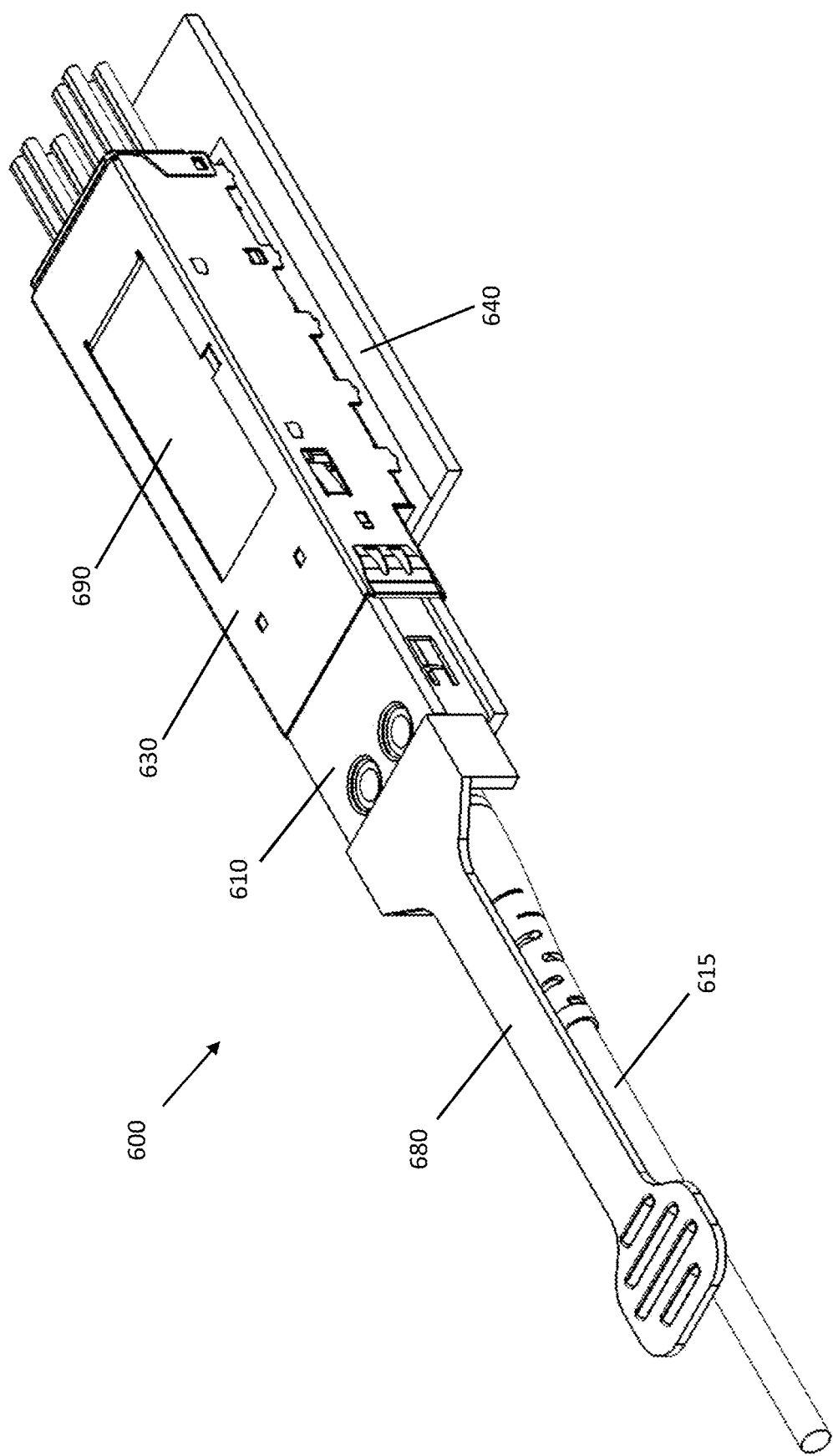
FIG. 6 is a perspective view of a transceiver assembly according to a preferred embodiment of the present invention.

FIG. 6 shows a transceiver assembly 600 according to a preferred embodiment of the present invention. As shown in FIG. 6, the transceiver assembly 600 includes a transceiver 610 of an active optical cable (AOC) 615 plugged into an electrically conductive cage assembly 630 mounted to a PCB 640. A pull tab 680 is optionally used to grip and handle the transceiver assembly 600 for insertion and extraction into the cage assembly 630. Although not shown in FIG. 6, a heat exchanger, such as a heatsink, a cold plate, or a heat pipe, can contact the top of the transceiver 610 via a top of the cage assembly 630 or through the opening 690 in the cage assembly 630, as discussed in detail below.

Figure 8:
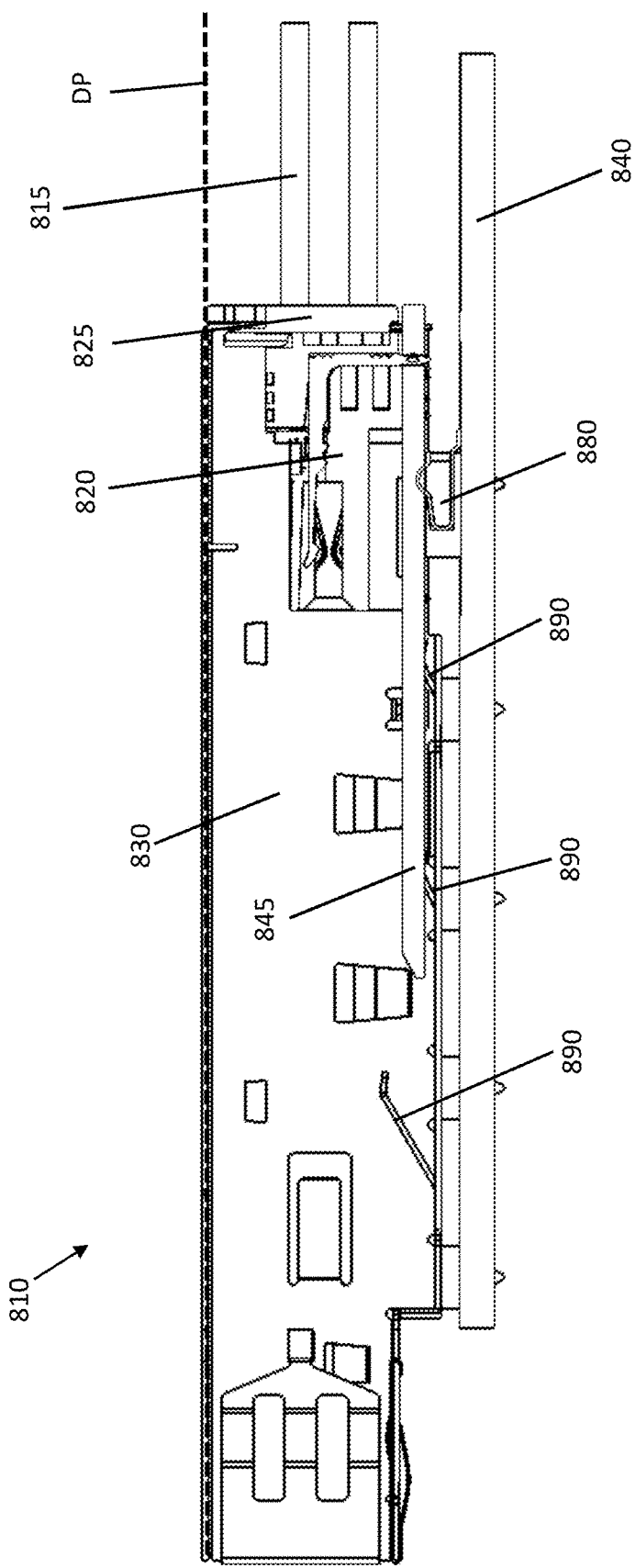
FIGS. 8 and 9 are sectional views of cage assemblies according to preferred embodiments of the present invention.

Both active and passive heat exchangers can be used. An active heat exchanger, for example, can be a cold plate that uses convective liquid cooling or can be a heat pipe or vapor chamber that uses phase transitions to provide cooling. A passive heat exchanger can be a heatsink that provides convective cooling. Because the top of the cage and a bottom surface of the heat exchanger are both static or fixed or designed to not move with respect to each other, the datum plane (as shown in FIG. 8) of the bottom surface of the heat exchanger is static or fixed. The heat exchanger can include mesas and/or grooves to offset height differences in the cage assemblies (as shown, for example, in FIG. 6) resulting from manufacturing tolerances.

Figure 7:
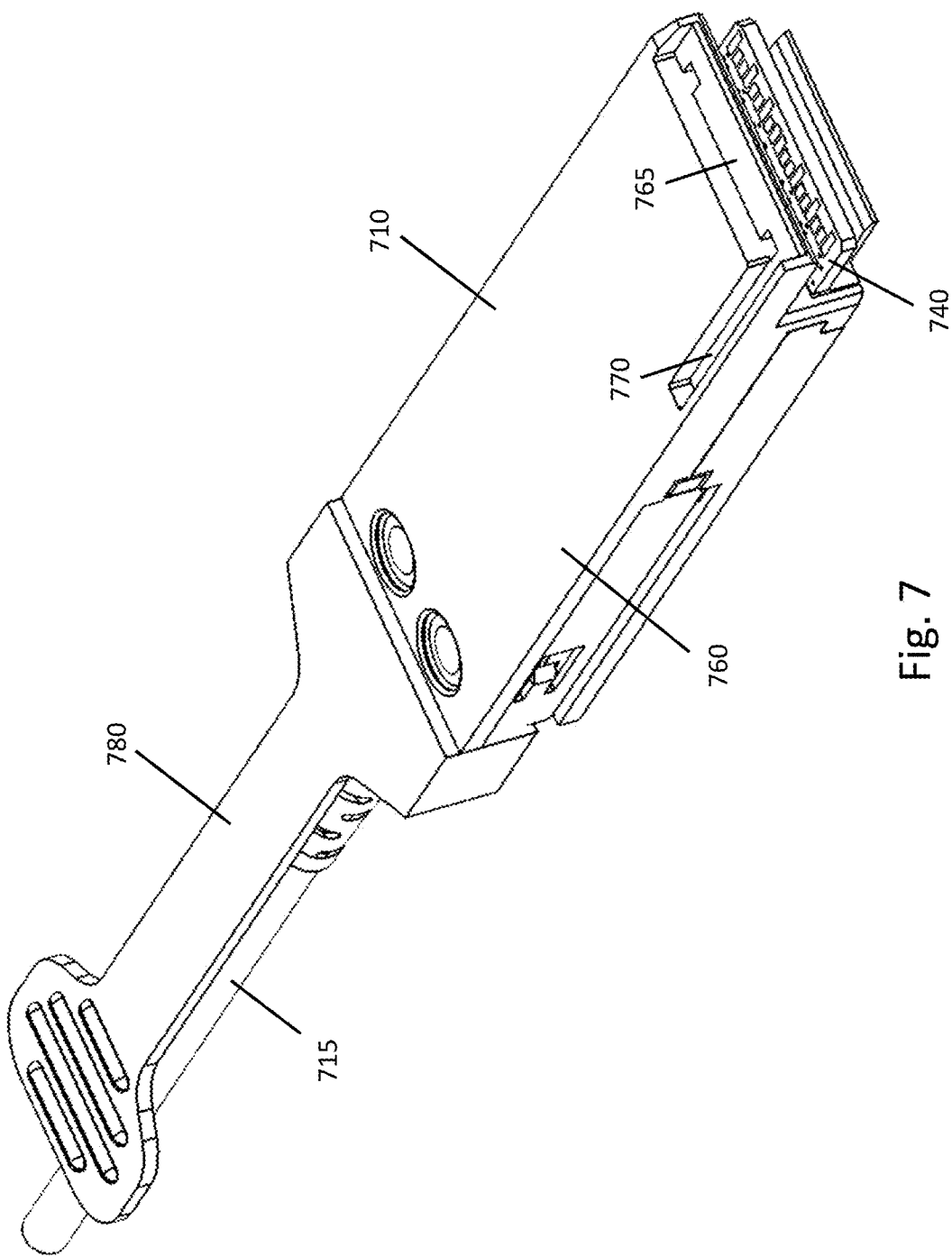
FIG. 7 is a perspective view of a transceiver according to a preferred embodiment of the present invention.

FIG. 7 shows an exemplary transceiver 710 according to a preferred embodiment of the present invention. The transceiver 710 can be a front-panel-pluggable transceiver. The transceiver shown in FIG. 7 is a QSFP transceiver; however, any suitable transceiver standard, including, for example, SFP, QSFP-DD, OSFP, CFP, CXP, CDFP, as well as transceiver standards yet to be developed can be used. Transceivers, such as OSFP transceivers, that include a heatsink that is integral with the transceiver housing, can be used with the cage assemblies of various preferred embodiments of the present invention. Such cage assemblies can improve the heat dissipation capacity of the transceivers by increasing the effective fin length of the heatsink and by increasing the available surface area used to dissipate heat.

As shown in FIG. 7, the transceiver 710 includes a housing 760, a cable 715 connected to the housing 760, a pull tab 780 used to plug/unplug the transceiver 710 into and from the cage assembly, and a transceiver PCB 740. FIG. 7 shows that the housing 760 can include a ledge 765 and a groove 770 that engage with the cage to orient the transceiver 710 within the cage when the transceiver 710 is plugged into the cage assembly. As shown in FIG. 7, the groove 770 and the ledge 765 can be connected, but this is not necessary. FIG. 7 also shows a transceiver PCB 740 with an exposed edge that includes contact pads.

Figure 9:
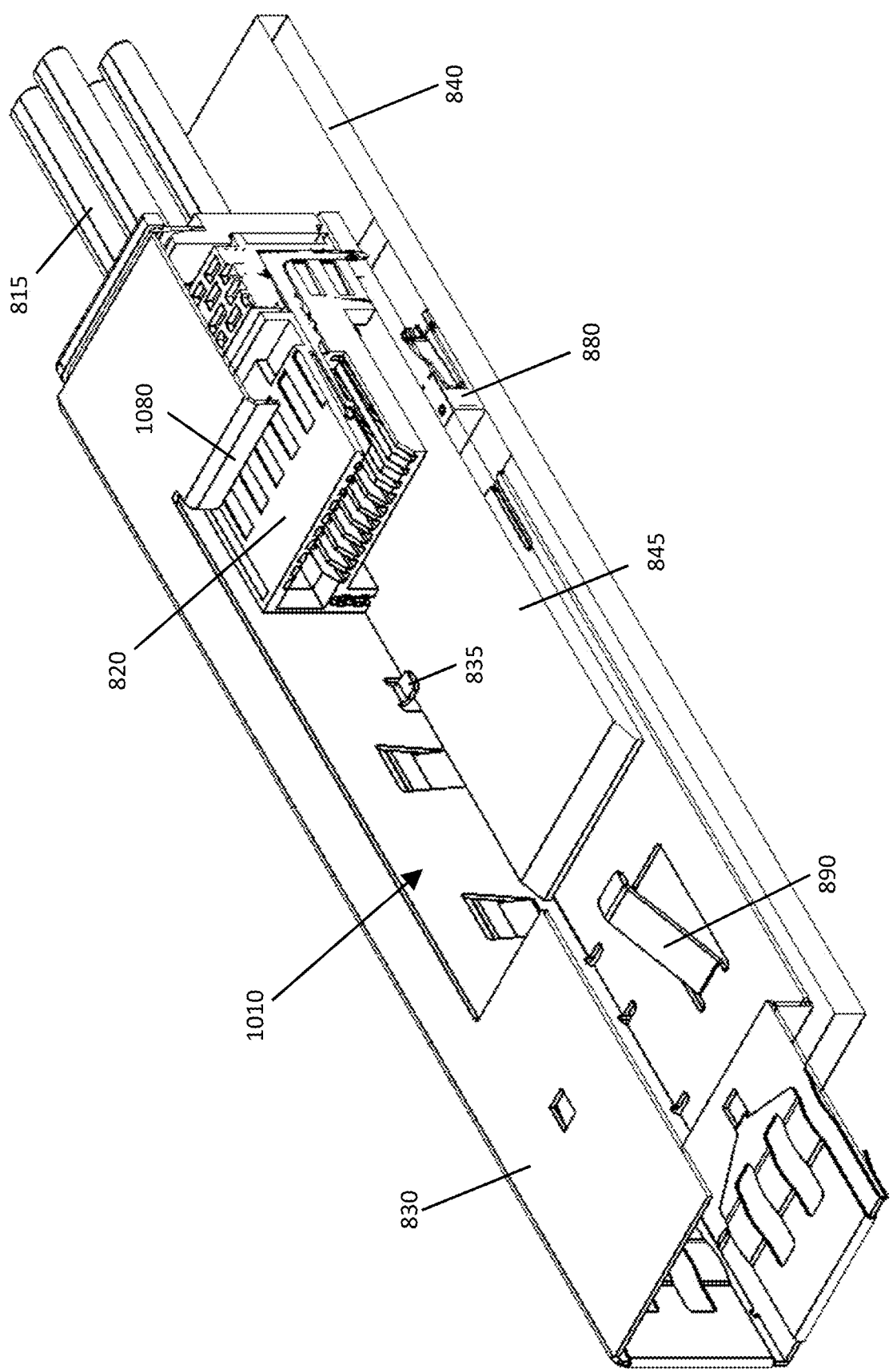

FIGS. 8 and 9 show exemplary views of the cage assembly 810 without a mating transceiver. As shown in FIGS. 8 and 9, the cage assembly 810 can include a cage 830 and, a receptacle 820 and an intermediate PCB 845 (separate from the transceiver PCB) within the cage 830 that mechanically float relative to the cage 830 such that the positions of the receptacle 820 and the intermediate PCB 845 relative to the cage 830 are not fixed. Any suitable substrate can be used instead of the intermediate PCB 845. The transceiver also floats in the up and down directions within the cage assembly 810 or relative to the cage assembly 810 or heat exchanger (not shown in FIGS. 8 and 9) when the transceiver is plugged into the receptacle 820.

Cables 815 can extend from the back of the cage 830 and can be connected to the receptacle 820 using a grommet 825. The cables 815 can be referred to as "jumper cables" because the cables 815 make a direct electrical connection between the receptacle 820 and a remote location on the PCB 840 that supports the cage 830, i.e. the cables 815 jumper the PCB 840. Any suitable cables 815 can be used for the jumper cables 815, including, for example, twinaxial and coaxial cables. The jumper cables 815 can include low-speed jumper cables in addition to high-speed jumper cables.

The receptacle 820 can be mounted to the intermediate PCB 845 and can include contacts that are directly connected to the intermediate PCB 845 and other contacts that are connected to the cables 815. The receptacle 820 can include press-fit tails or eye-of-the-needle tails that can be inserted into corresponding holes in the intermediate PCB 845 to mount the receptacle 820 to the intermediate PCB 845. The tails of the receptacle 820 can be inserted into corresponding holes in the intermediate PCB 845. It is possible to mount the receptacle 820 to the intermediate PCB 845 in other manners, including, for example, surface-mount technology (SMT) or through-hole soldering.

It is possible to transport, i.e., transmit or receive, high-speed signals, e.g. data signals, through the contacts connected to the jumper cables 815 and to transport low-speed signals, e.g., control or sideband signals, and power through the contacts directly connected to the intermediate PCB 845. Instead of or in addition to using jumper cables 815, a high-speed interposer can be used to route the high-speed signals to the PCB 840. The high-speed interposer can use any suitable contacts, including for example, pogo pins, compression contacts, dual cantilevered arms, single cantilevered arm with solder balls, complaint pin contacts, to transport the high-speed signals. Low-speed signals can also be transported by the jumper cables 815, in which case low-speed cables can be used. The receptacle 820 can include a latching feature, making it easier to plug the transceiver into the cage assembly 830. If the receptacle 820 includes a latching feature, then the pull tab can be used to unlatch the transceiver from the receptacle 820 to unplug the transceiver from the cage assembly 830.

The cage 830 can include arms 890 that extend from the bottom of the cage 830. The arms 890 elastically deform when a transceiver is inserted into the cage 830, providing a spring force against the bottom of the transceiver. The arms 890 provide a normal force on the transceiver and the intermediate PCB 845 forcing both the transceiver and intermediate PCB 845 upward toward the top wall or opening 1070 of the cage 830. Travel of the transceiver and intermediate PCB 845 in the upward direction is limited by the top of the transceiver housing contacting the bottom of the heat exchanger through the opening 1010 in the cage 830. The normal force pressing the top of the transceiver housing against the bottom of the heat exchanger provides mechanical contact between the transceiver housing and the heat exchanger, and thus providing a continuous conductive heat transfer path for heat flow from the transceiver housing to the heat exchanger.

The cage 830 includes first and second opposed side walls connected by opposed top and bottom walls, where each of the first and second side walls, the top wall, and the bottom wall extend along the length of the cage from front to back of the cage. The top wall can include an opening that can receive a portion of the heat exchanger. The arms extend from the bottom wall to push the transceiver toward the top wall when the transceiver is inserted into the cage.

Figure 10:
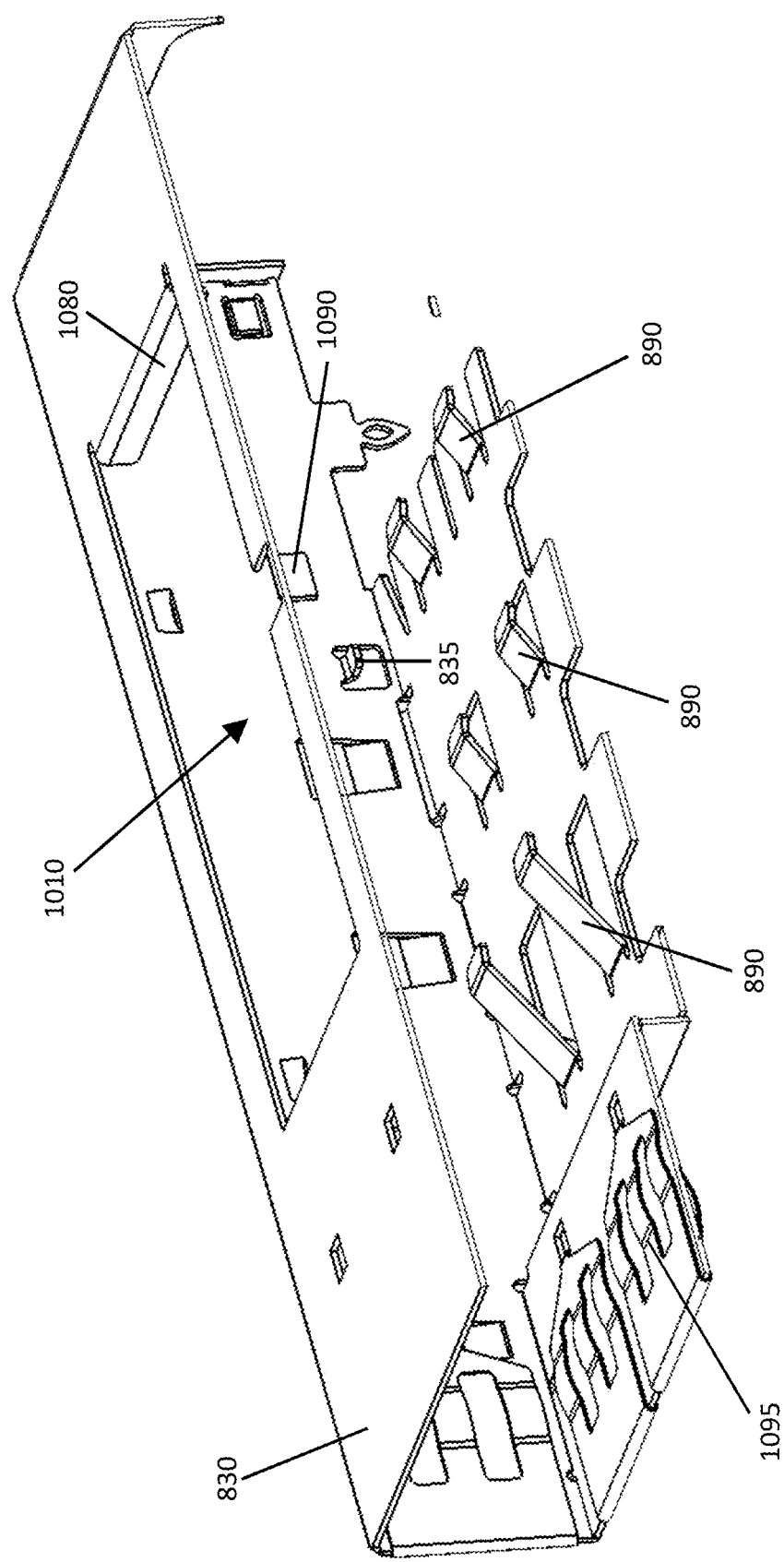
FIGS. 10 and 11 are perspective sectional views of cages according to preferred embodiments of the present invention.

As shown in FIG. 10, the cage 830 can include six arms 890 in three rows of two arms. The front two arms 890 (toward the opening of the cage 830) can engage the transceiver when the transceiver is plugged into the cage 830, and the rear four arms 890 can engage the intermediate PCB 845. The number of arms 890 is not limited to six, and any number and arrangement of arms 890 can be used. The intermediate PCB 845 can be shortened to provide additional arms 890 that can engage the transceiver when the transceiver is plugged into the cage 830.

As shown in FIGS. 8 and 9, the cage assembly 810 also can include a compression connector 880 with contacts that contact the bottom of the intermediate PCB 845, providing a normal force pushing the intermediate PCB 845 towards the top of the cage 830. The compression connector 880 can be electrically connected, via the intermediate PCB 845, to contacts in the receptacle 820 that are directly connected to the intermediate PCB 845. A low-speed or power electrical path can be established between the PCB 840 and the transceiver via the receptacle 820, the intermediate PCB 845, and the compression connector 880, and high-speed signals can be transported by the jumper cables 815. Alternatively, high-speed, low-speed, and power signals can all be transported between the receptacle connector 820 to the PCB 840 via the compression connector 880. In addition to, or instead of, the low-speed signals transported by the compression connector 880, low-speed signals can also be transported by low-speed jumper cables 815. High-quality, low-impedance ground paths can be provided to ensure adequate signal integrity. The arms 890 and the contacts of the compression connector 880 allow the intermediate PCB 845 and the receptacle 820 to float, pushing the intermediate PCB 845 and the receptacle 820 toward the top of the cage 830. The cage 830 can include a stop 835, shown in FIG. 9, that prevents the intermediate PCB 845 and the receptacle 820 from being pushed too far toward the top of the cage 830, ensuring that the compression connector 880 maintains adequate physical and electrical connection with the intermediate PCB 845.

Figure 11:
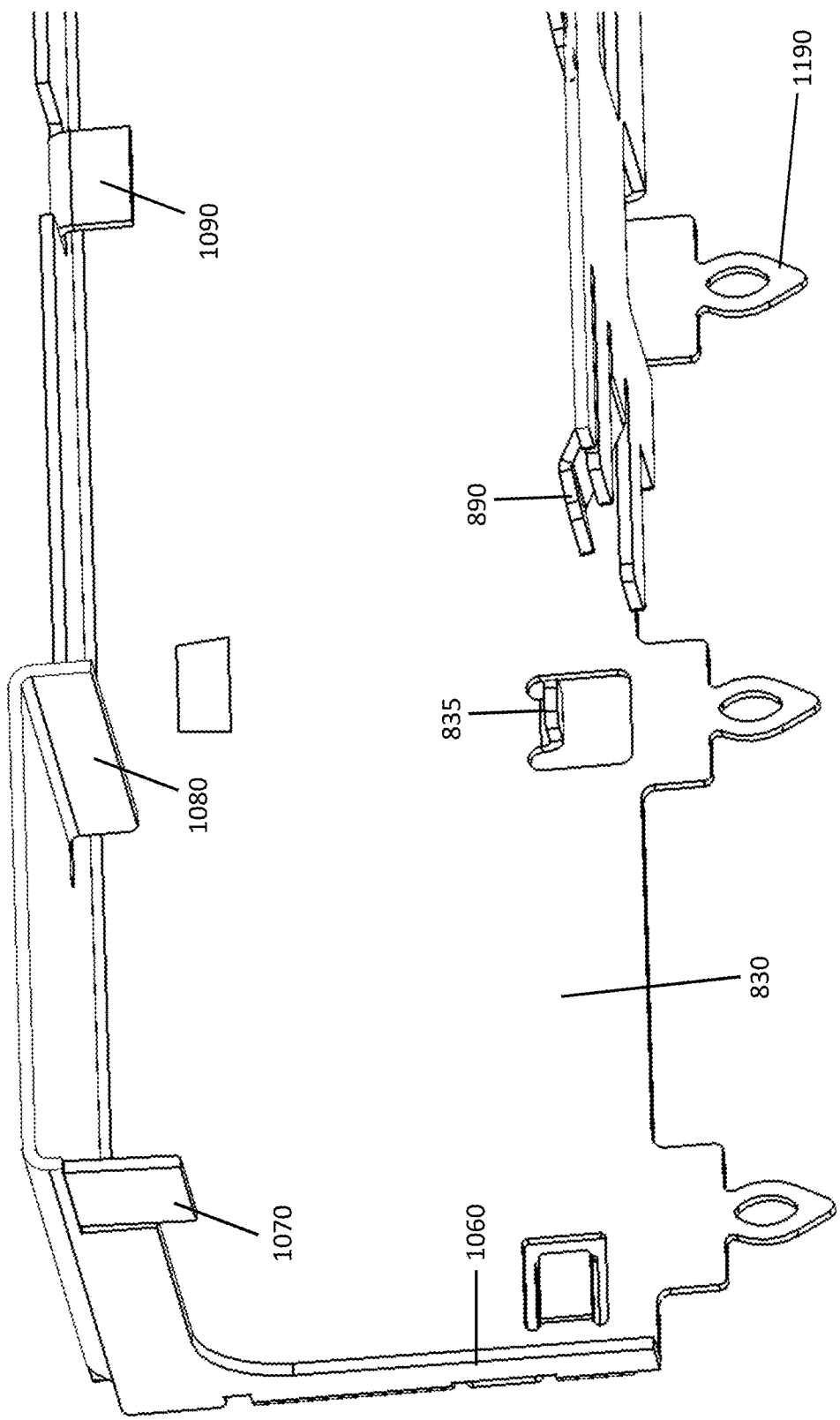

FIGS. 10 and 11 are cut-away views of the cage 830. As shown in FIGS. 9, 10, and 11, the cage 830 can include guides to orient the transceiver and other components within the cage 830. The cage 830 can include a first guide 1090 that extends parallel or substantially parallel within manufacturing tolerances to the transceiver-insertion direction that engages with the groove of the transceiver housing. The cage 830 can also include a second guide 1080 that extends perpendicular or substantially perpendicular within manufacturing tolerances to the transceiver-insertion direction along the width direction of the cage 830 that engages with the ledge of the transceiver housing. The cage 830 can also include a third guide 1070 that extends perpendicular or substantially perpendicular within manufacturing tolerances to the transceiver-insertion direction along the width direction of the cage 830 that engages with a slot in the grommet 825. The second guide 1080 can be located adjacent to the opening 1010, and the third guide 1070 can be located at the back of the cage 830. The second guide 1080 can be replaced with a stop on the receptacle 820. Replacing the second guide 1080 with a stop on the receptacle 820 can reduce tolerance stack up between the transceiver and the receptacle 820 because the transceiver is stopped by the stop on the receptacle 820 instead of the second guide 1080 on the cage 830. It is possible to use a structure on the receptacle 820 as a stop because of the electrical connection between the intermediate PCB 845 and the compression connector 880 is not easily breakable in the transceiver-insertion direction, i.e., the tolerances between the intermediate PCB 845 and the compression connector 880 allow a small amount of movement in the transceiver-insertion direction while maintaining an electrical connection, and because the third guide 1070 and the fourth guides 1060 prevent movement in the insertion direction of the transceiver, while allowing up and down movement between the top and bottom of the cage 830.

Figure 12:
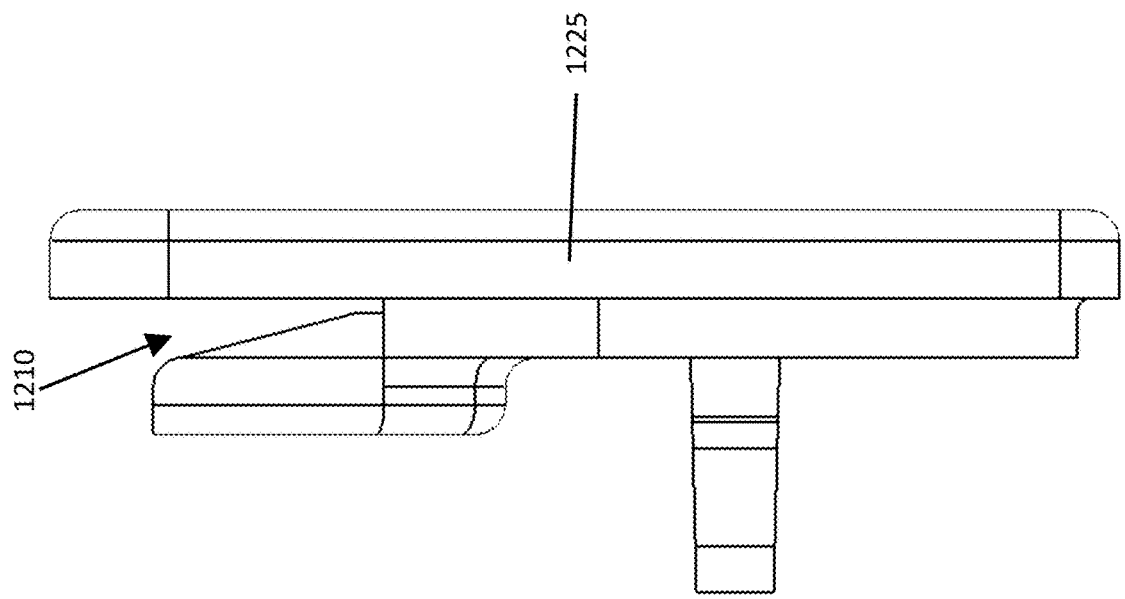
FIG. 12 is a side view of a grommet according to a preferred embodiment of the present invention.

FIG. 12 is a side view of a grommet 1225 and shows a slot 1210 in the grommet 1225. As previously discussed, the grommet 1225 can be a die cast piece used to connect the jumper cables to the back of the receptacle.

Figure 13:
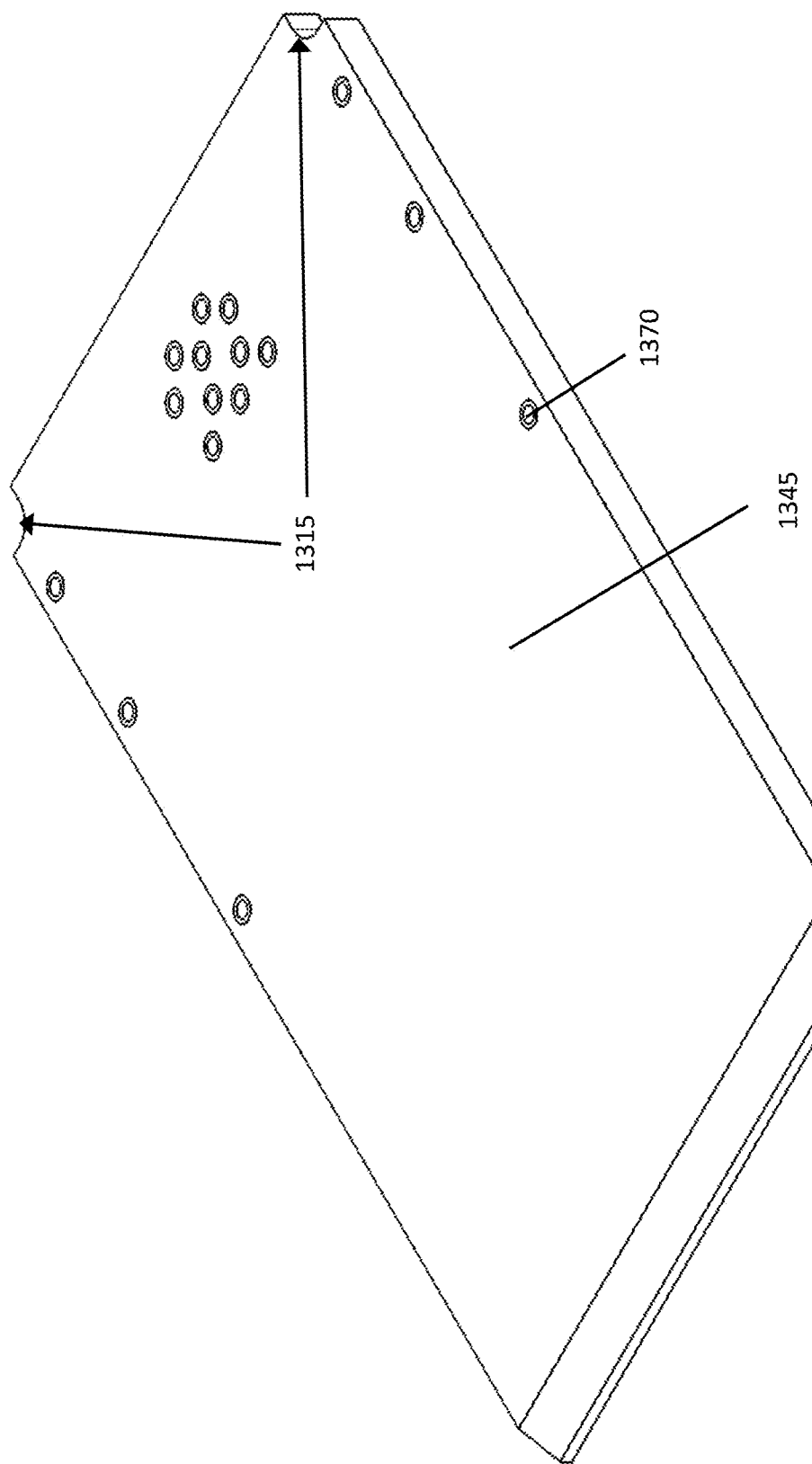
FIG. 13 is a perspective view of the intermediate PCB according to a preferred embodiment of the present invention.

As shown in FIG. 11, the cage 830 can also include fourth guides 1060 that extend perpendicular or substantially perpendicular within manufacturing tolerances to the transceiver-insertion direction along the height direction of the cage 830 that engages with a groove in the intermediate PCB 845. FIG. 13 shows an intermediate PCB 1345 with two grooves 1315. The cage 830 can include two fourth guides 1060, one on each of the right and left sides of the cage 830, to engage the two grooves 1315 in the intermediate PCB 1345, for example. The third guides 1070 and fourth guides 1060 that engage the grommet 1225 and the intermediate PCB 1345, respectively, can be arranged to ensure that the intermediate PCB 1345 can float in the up and down directions without twisting.

The cage 830 can be made by stamping a flat metal sheet. The cage 830 can include press-fit tails or eye-of-the-needle tails 1190 as shown, for example, in FIG. 11. The tails 1190 of the cage 830 can be inserted into corresponding holes 1370 (see FIG. 13) in the PCB 840 to mount the cage 830 to the PCB 840. It is possible to mount the cage 830 to the PCB 840 in other manners, including, for example, surface mounting or through-hole soldering.

To reduce electromagnetic interference (EMI), spring fingers 1095, shown in FIG. 10, can be added to the opening in the front of the cage 830 into which the transceiver is inserted. If spring fingers 1095 are needed at the top of the front opening, then the cage 830 can include an upward offset that will allow the spring fingers 1095 at the top of the front opening to deflect while still letting the transceiver contact the top of the cage 830.

Figure 14:
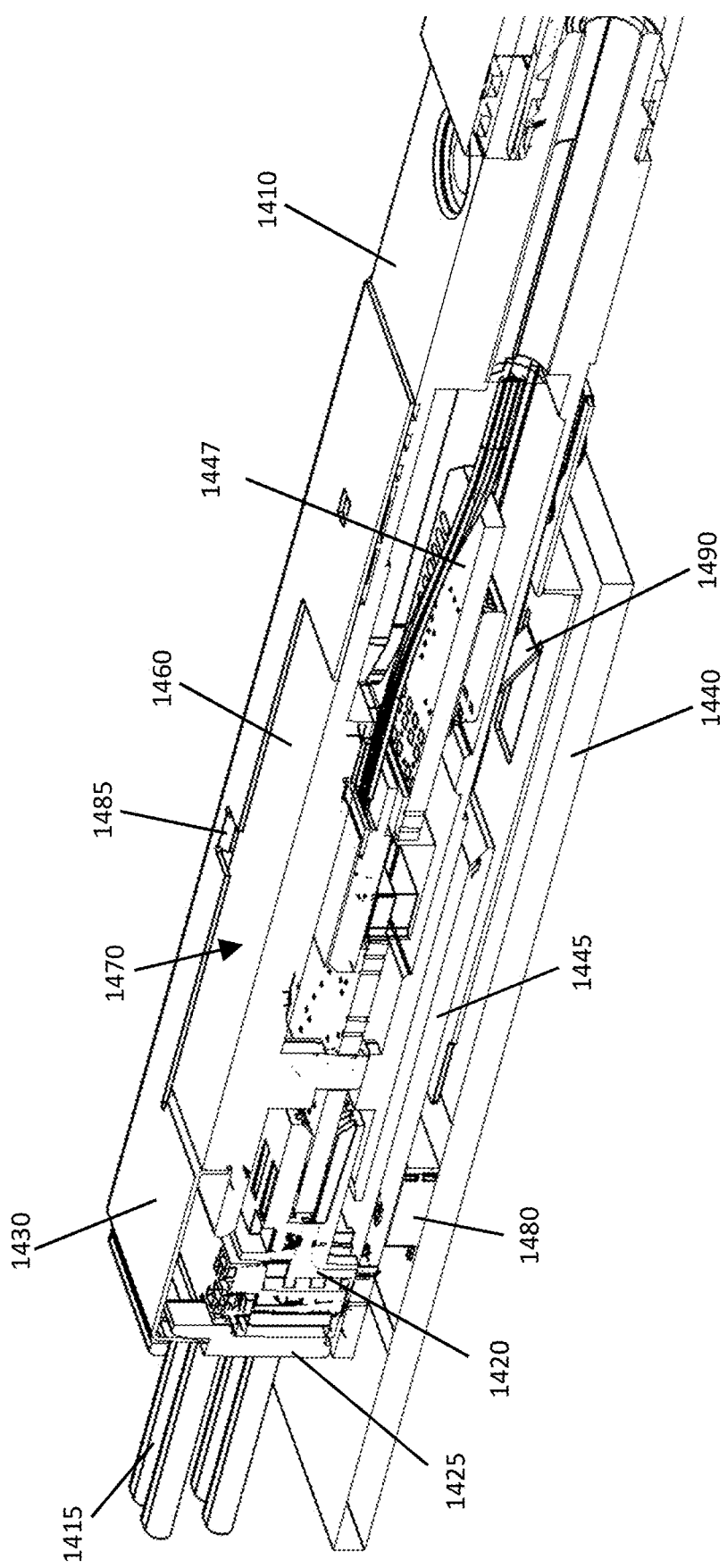
FIGS. 14-16 are sectional views of the transceiver assembly according to a preferred embodiment of the present invention.
Figure 15:
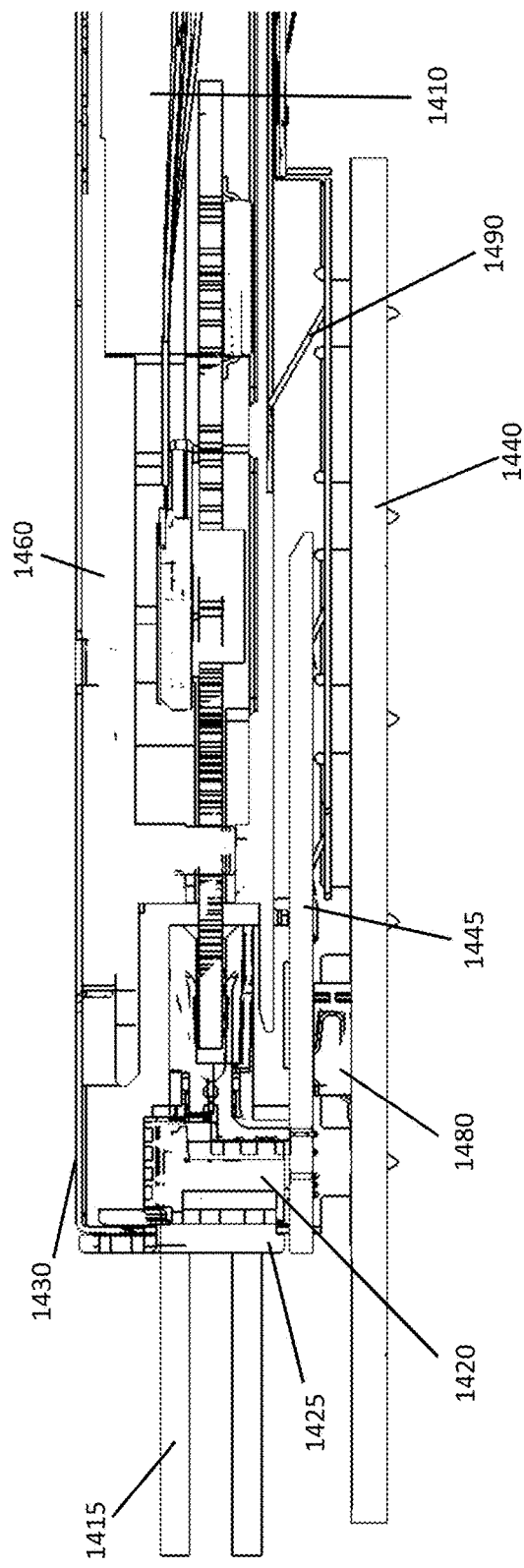
Figure 16:
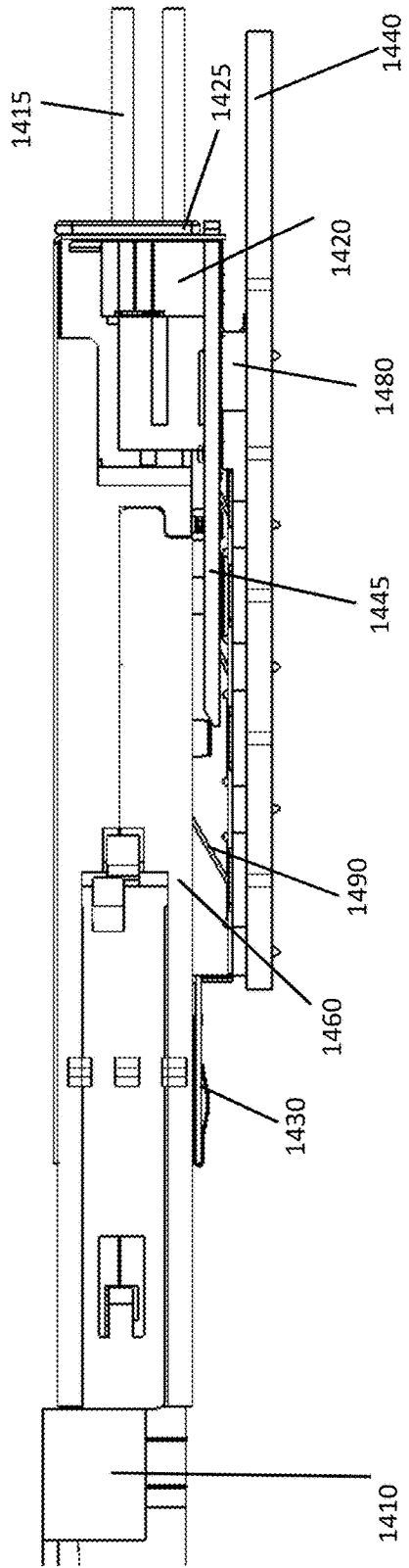

FIGS. 14-16 show cut-away views of a transceiver assembly inserted into a cage assembly that is mounted on a PCB 1440. As shown in FIGS. 14-16, the transceiver assembly can include a transceiver 1410, a housing 1460, and a transceiver PCB 1447. The cage assembly can include a cage 1430, a receptacle 1420, a cable 1415, and an intermediate PCB 1445. As shown, a grommet 1425 can be retained by the cage 1430. As also shown, the cage 1430 can include an opening 1470, a first guide 1485, and an arm 1490. A compression connector 1480 is shown between the PCB 1440 and the intermediate PCB 1445.

Figure 17:
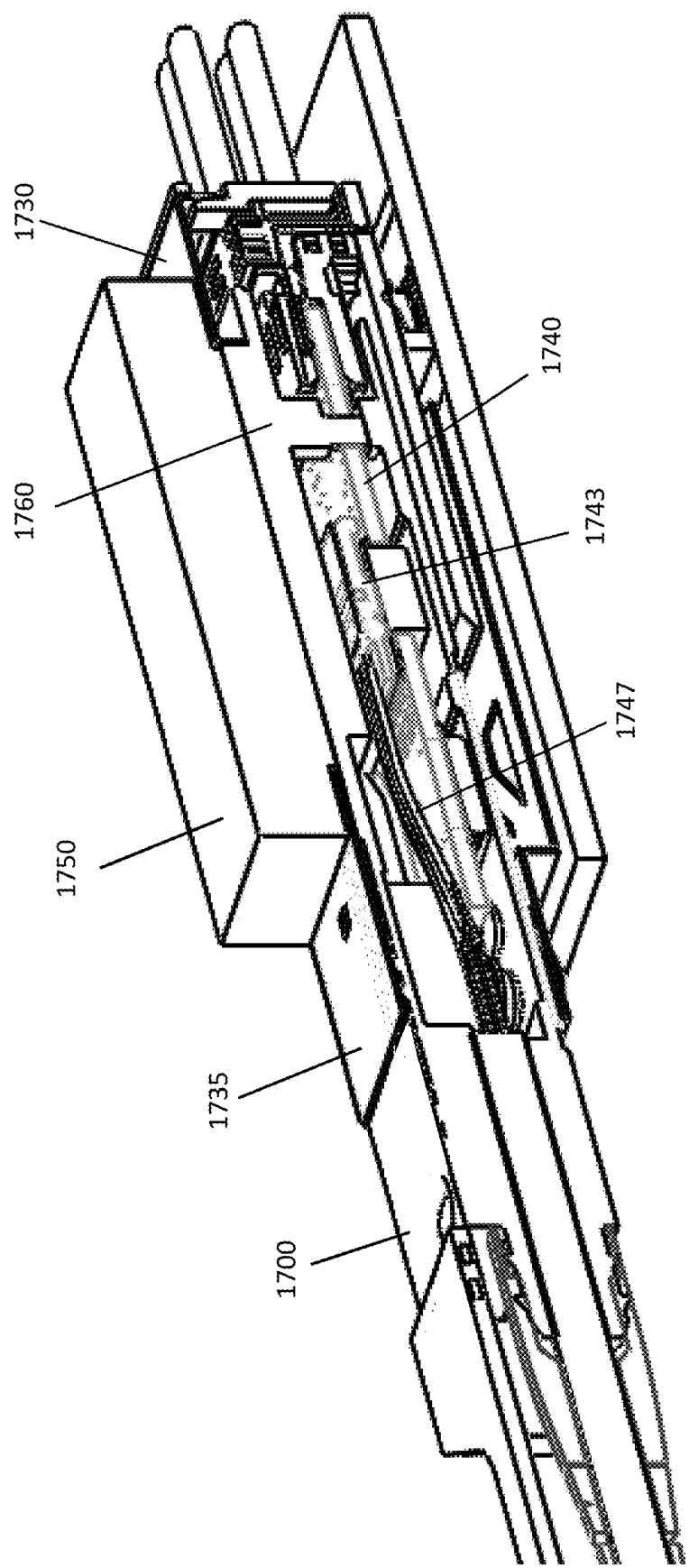
FIG. 17 is a sectional view of a transceiver assembly according to a preferred embodiment of the present invention.

As previously mentioned, a heat exchanger, such as a heatsink, a cold plate, or a heat pipe, can contact the top of a transceiver 1410 via the top of the cage 1430 or through an opening 1470 in the cage 1430 to transfer heat away from the transceiver and cage assemblies. FIG. 17 is a cross sectional view according to a preferred embodiment that shows a heat exchanger 1750 attached to a cage assembly 1730 with a transceiver assembly 1700 plugged into the cage assembly 1730. As shown in FIG. 17, the heat exchanger 1750 is shaped to include a protruding portion that protrudes into an opening in the top of a cage 1735 and contacts a top of the transceiver housing 1760. A plane defined by the protrusion of the heat exchanger 1750 is at a common datum plane DP, shown in FIG. 8, with respect to the transceiver assembly 1700.

Within the housing 1760, the transceiver 1700 can include a transceiver PCB 1740 on which heat-generating components are mounted. The heat-generating components can include, for example, integrated circuit (IC) chips and active optical components such as electro-optical (E-O) components and optical-electrical (O-E) components. A molded optical structure (MOS) 1743 can transport light signals between optical fibers 1747 and the active optical components. E-O components are used to convert electrical signals from the transceiver PCB 1740 to light signals that are transported to the optical fibers 1747. The O-E components are used to convert light signals from the optical fibers 1747 to electrical signals that are transported to the transceiver PCB 1740. The IC chips can be used to control the E-O and/or O-E components and to condition or modify the electrical signals. The transceiver 1700 typically includes both E-O and O-E components so that the transceiver 1700 is both a receiver and a transmitter, i.e., a transceiver. But it is possible that the transceiver 1700 can include only E-O components if the transceiver 1700 is a receiver or only O-E components if the transceiver 1700 is a transmitter.

A thermal path is created between the heat exchanger 1750 and the housing 1760 so that heat from the heat-generating components is transferred from the transceiver 1700 to the heat exchanger 1750. Proper thermal management ensures that the transceiver's components stay within their rated operating temperatures. If the components exceed their rated operating temperatures, then the components can fail to operate properly or can be damaged. As previously described, the arms in the cage 1765 provide a normal force on the transceiver 1700 to ensure adequate contact between the transceiver housing 1760 and the heat exchanger 1750, even if the transceiver height varies among the transceivers because of manufacturing tolerances.

Figure 18:
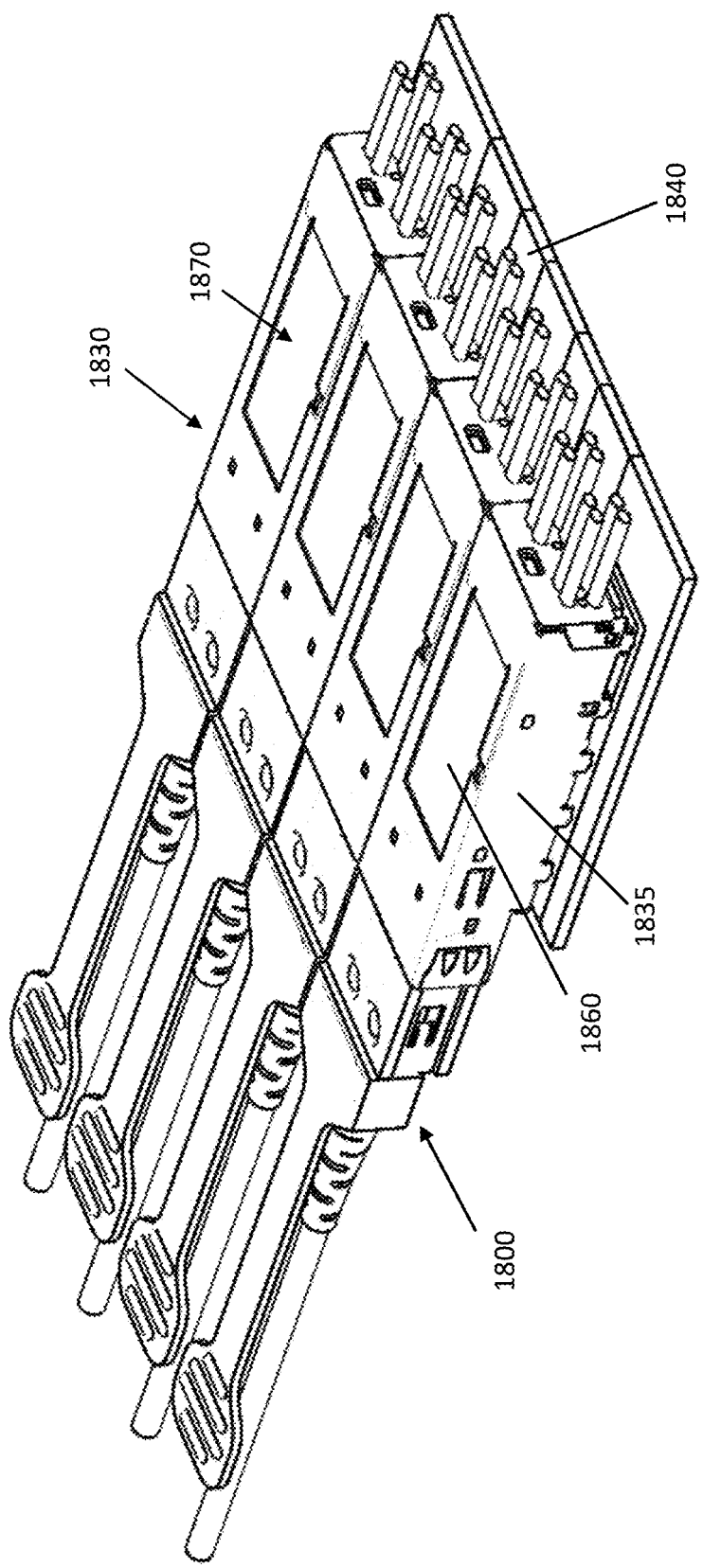
FIG. 18 is a perspective views of a transceiver assembly array of a preferred embodiment of the present invention.

FIG. 18 shows an array of transceiver assemblies 1800 plugged into an array of cage assemblies 1830 according to a preferred embodiment of the present invention. As shown in FIG. 18, the cage assemblies 1830 are mounted onto a PCB 1840, and each cage 1835 includes an opening 1870 exposing a top of the transceiver housing 1860.

Figure 19:
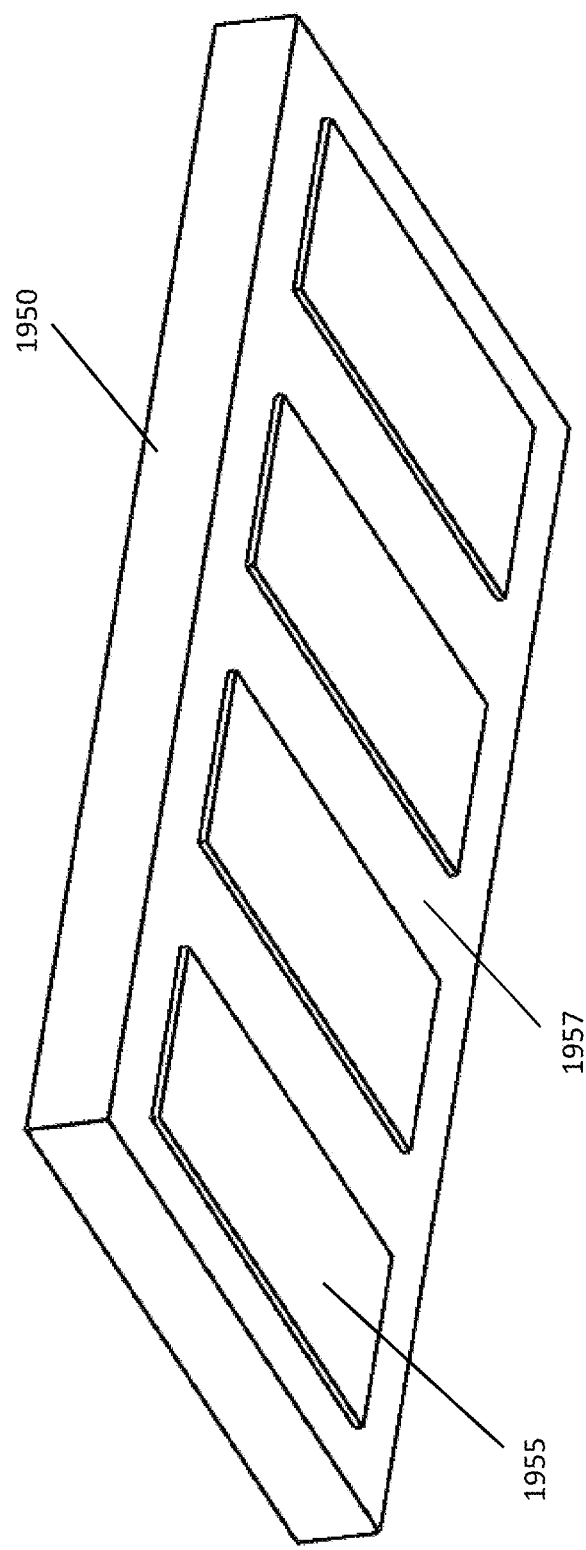
FIG. 19 is a perspective view of a heat exchanger according to a preferred embodiment of the present invention.

FIG. 19 shows a heat exchanger 1950 according to a preferred embodiment of the present invention. The heat exchanger 1950 can be mated with the array of transceiver and cage assemblies shown in FIG. 18. As shown in FIG. 19, the heat exchanger 1950 can include a plurality of protrusions 1955 that are shaped to fit into the openings of the cages to contact the tops of the transceiver housings. A bottom surface 1957 of the heat exchanger 1950 can be shaped to contact a top surface of the cage assemblies.

Figure 20:
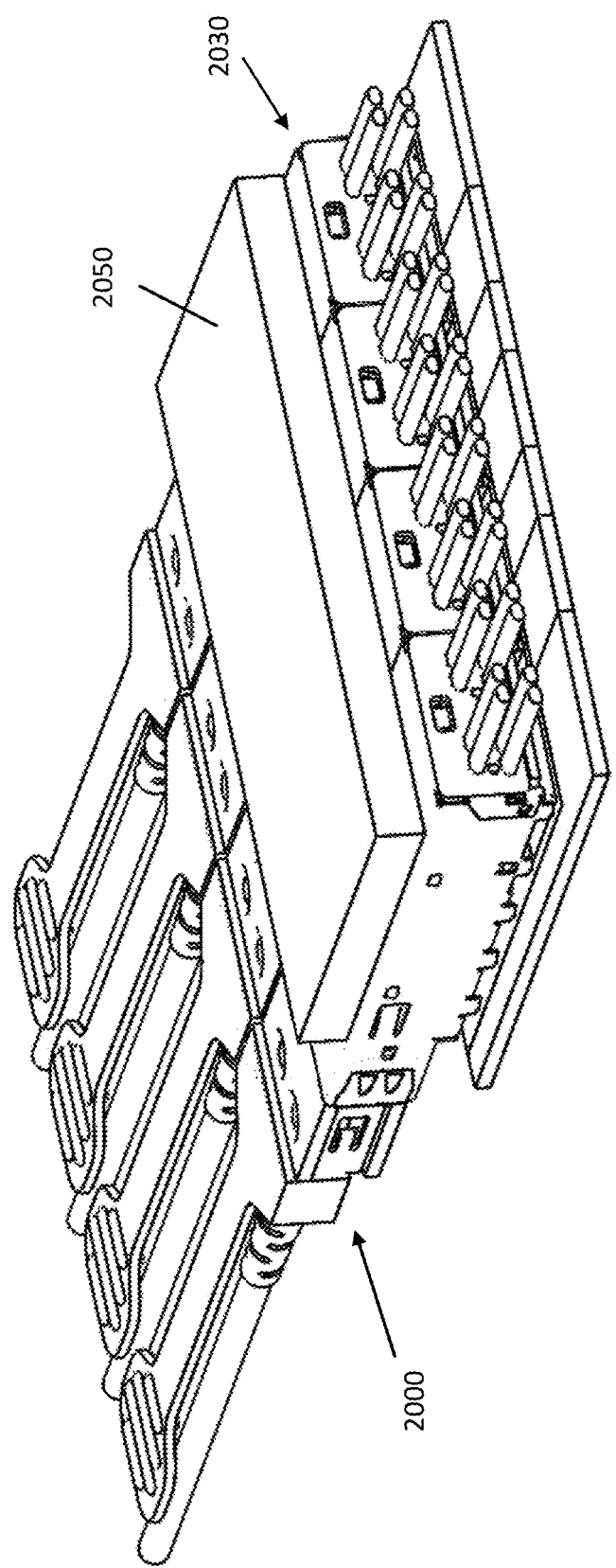
FIG. 20 is a perspective view of a transceiver assembly array of a preferred embodiment of the present invention.

FIG. 20 shows a heat exchanger 2050 similar to that of FIG. 19 attached to the array of transceiver assemblies 2000 and cage assemblies 2030 similar to that of FIG. 18. As shown in FIG. 20, the protrusions of the heat exchanger 2050 are inserted into the openings in the cages such that the bottom surfaces of the protrusions contact the tops of the transceiver housings and the bottom surface of the heat exchanger is contacting a top surface of the cage assemblies 2030.

Figure 36:
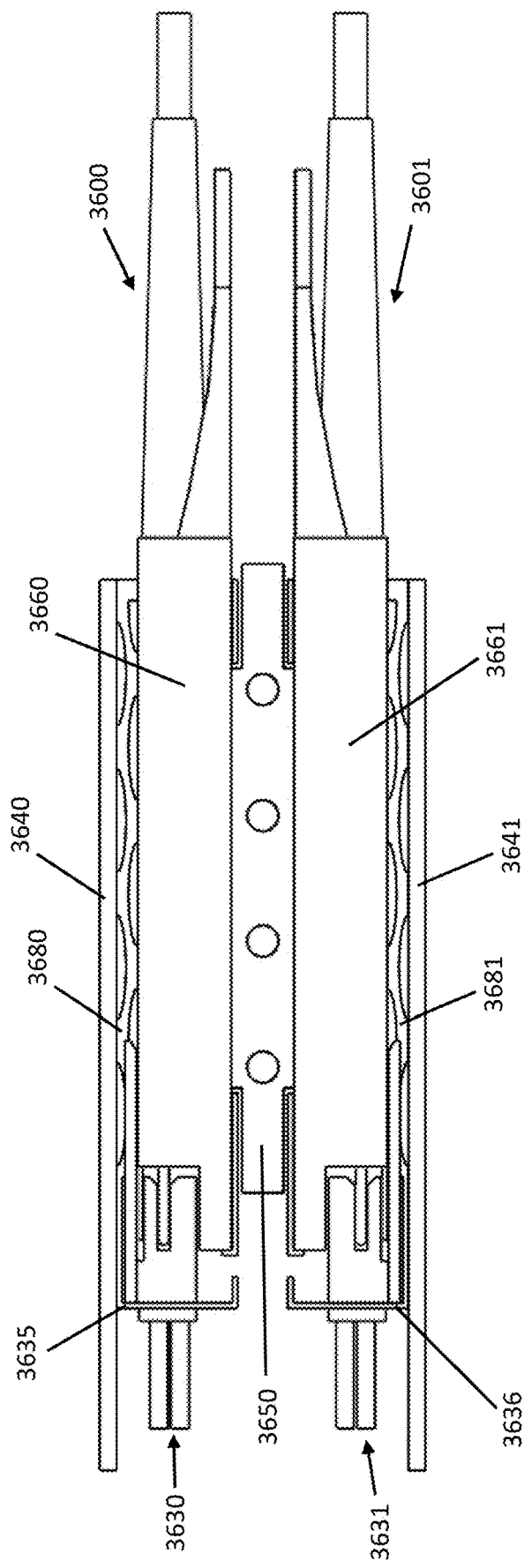
FIG. 36 is a simplified sectional view of a transceiver assembly array of a preferred embodiment of the present invention.

FIG. 18 shows an array of transceiver assemblies 1800 in which the cage assemblies 1830 are arranged side by side along one dimension. It is also possible to arrange the transceiver assemblies in a two dimensional array in which cage assemblies, in addition to being arranged side by side, are stacked on top of each other, as shown in the simplified sectional view of FIG. 36. In FIG. 36, an array of transceiver assemblies 3600, 3601 includes an array of cage assemblies 3630, 3631 that are mounted onto PCBs 3640, 3641, and each cage 3635, 3636 includes an opening (not labeled) into which a common heat exchanger 3650 extends. As shown in FIG. 36, the top of each of the transceiver housings 3660, 3661 is pushed into in direct contact with the common heat exchanger 3650 by biasing member 3680, 3681.

In a transceiver assembly array, a common heat exchanger for each transceiver assembly can be used because the transceiver assemblies share a common datum plane, i.e., the openings of the cages are in the same plane or substantially the same plane within manufacturing tolerances. Using a common heat exchanger for the transceiver assembly array makes thermal management easier. For example, a common heat exchanger increases the heat-dissipation area because there are no gaps between the individual heat exchangers and because the common heat exchanger spreads heat flow between adjacent cages. For a vacant cage without a transceiver, adjacent occupied cages with transceivers can use the vacant cage's heat exchanger. In addition, a common heat exchanger allows the use of some high-heat-dissipation transceivers so long as the average heat load of all transceivers is below a specified limit. A common liquid-cooled heat exchanger makes liquid cooling easier because the heat exchanger can be implemented with only two connections, i.e., one input connection and one output connection. A common heat exchanger can dissipate a large amount of heat that is generated by multiple transceivers in a small space. A common heat exchanger can dissipate more heat that can be accomplished with forced air or that can be cost effectively achieved with multiple heat exchangers.

Figure 21:
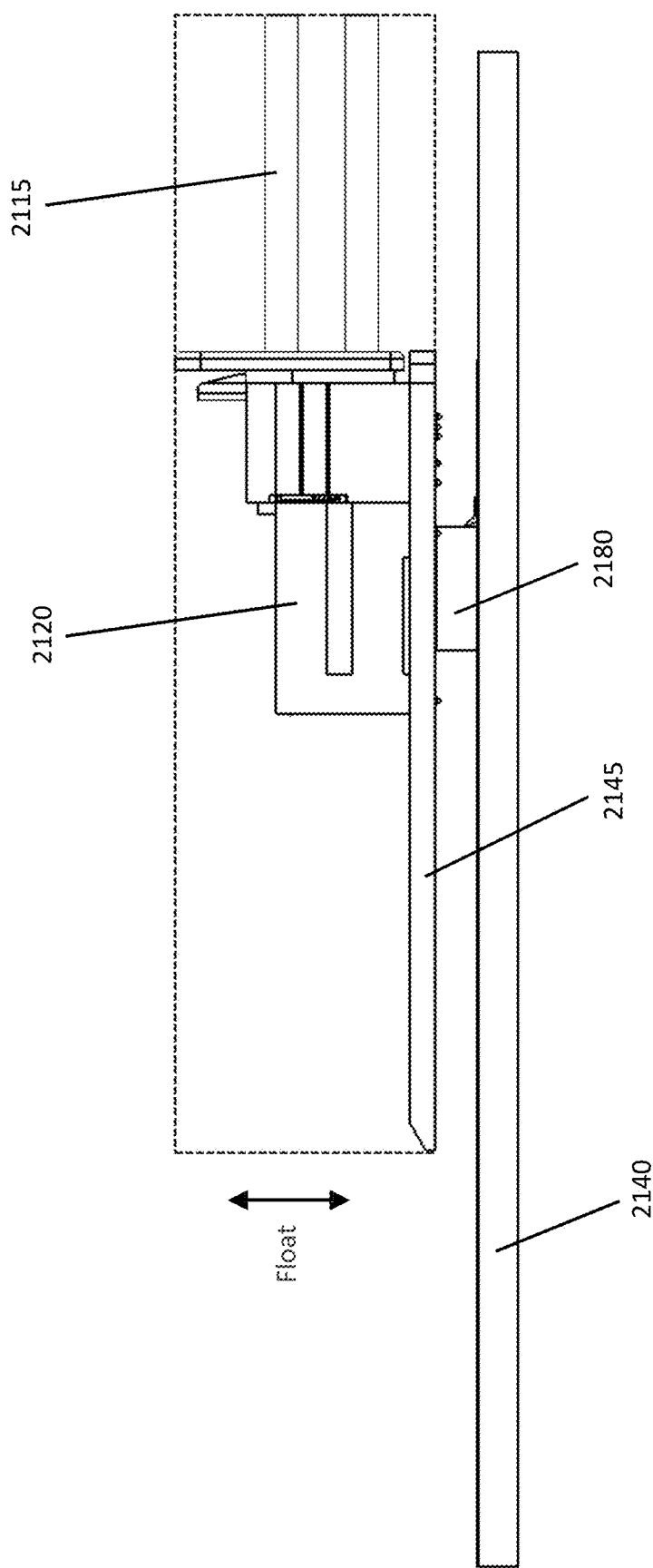
FIGS. 21 and 22 are a side view and a perspective of a floating connector and an intermediate PCB according to a preferred embodiment of the present invention.
Figure 22:
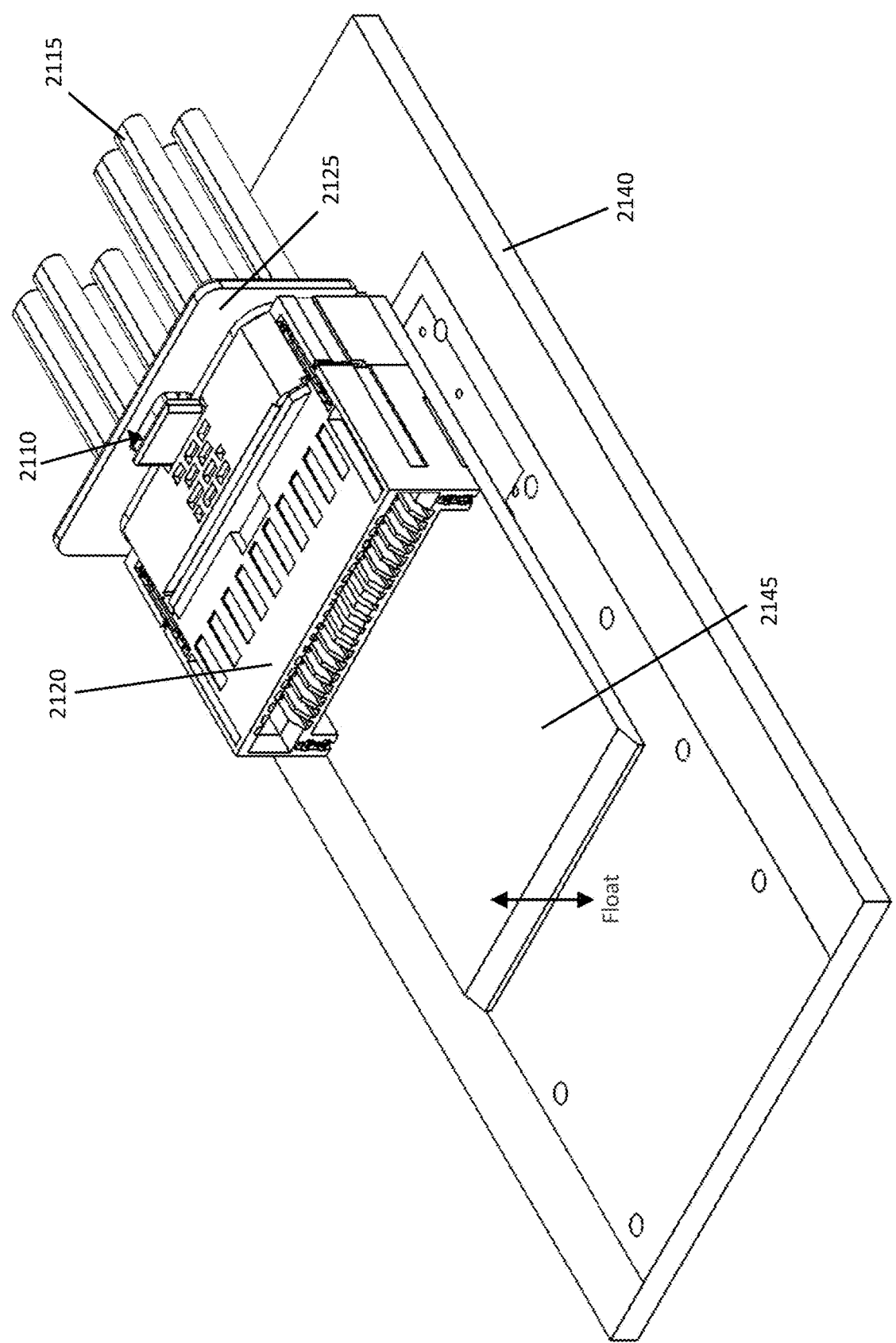

As previously discussed, components of a cage assembly can move or float in up and down directions, which helps accommodate mechanical tolerances in manufacturing. FIGS. 21 and 22 are views of some of the components of a cage assembly according to a preferred embodiment that illustrate this floating arrangement. FIGS. 21 and 22 show a cable 2115, a receptacle 2120, a grommet 2125, a slot 2110 on the grommet 2125, and an intermediate PCB 2145. As shown in FIGS. 21 and 22, the receptacle 2120 and the intermediate PCB 2145 float in a direction perpendicular to a larger flat surface of the PCB 2140, indicated by the two-way arrow, between opposed top and bottom walls of the cage (not shown) relative to the PCB 2140. It should be understood that any suitable substrate can be used instead of the intermediate PCB 2145. Although not shown in FIGS. 21 and 22, the transceiver also floats in the same direction within the cage assembly or relative to the cage assembly or heat exchanger when the transceiver is plugged into the receptacle. The cage assembly, the heat exchanger, or both, can be fixed, or the heat exchanger can move with respect to the cage. The transceiver can also move between a bottom wall of the cage and a bottom wall of the heat exchanger, and movement away from the bottom wall of the cage can be stopped by the bottom wall of the heat exchanger.

Because the top of the cage and a bottom surface of the heat exchanger are both static or fixed or do not move with respect to each other, the datum plane (as shown in FIG. 7) of the bottom surface of the heat exchanger is static or fixed. Because the receptacle 2120 and intermediate PCB 2145 float between the top and bottom walls of the cage and because the transceiver is biased in an upward direction toward the top wall of the cage, the maximum amount of the available surface area of the top of the transceiver is in contact with this datum plane and with the available bottom surface of the heat exchanger to ensure that the transceiver is in mechanical and thermal contact with the heat exchanger.

As shown in FIGS. 21 and 22, the components of the cage assembly, such as the intermediate PCB and the receptacle, can float in the up and down directions. While the components of the cage assembly can be constrained to float only in the up and down directions, the components of the cage assembly can float in other directions, for example, to accommodate manufacturing tolerances. That is, the components of the cage assembly can float (1) in two opposed directions relative to the top and bottom walls of the cage, (2) in two opposed directions relative to the top and bottom walls of the cage and in two additional opposed directions each transverse to the two opposed directions, or (3) in two opposed directions relative to the top and bottom walls of the cage, in two additional opposed directions each transverse to the two opposed directions, and in two more directions also each transverse to the two opposed directions. While the components of the cage assembly can be constrained to prevent rotation or twisting, it is possible for the components of the cage assembly to rotate or twist, for example, to accommodate manufacturing tolerances.

The side view of FIG. 21 also shows a compression connector 2180 between the PCB 2140 and intermediate PCB 2145. Instead of the contacts of the compression connector 2180 being connected to the intermediate PCB 2145, the contacts of the compression connector 2180 can be connected to the transceiver PCB 2145. Various preferred embodiments of the present invention in which the contacts of the compression connector can be connected to the transceiver PCB are shown in FIGS. 23-29.

Figure 23:
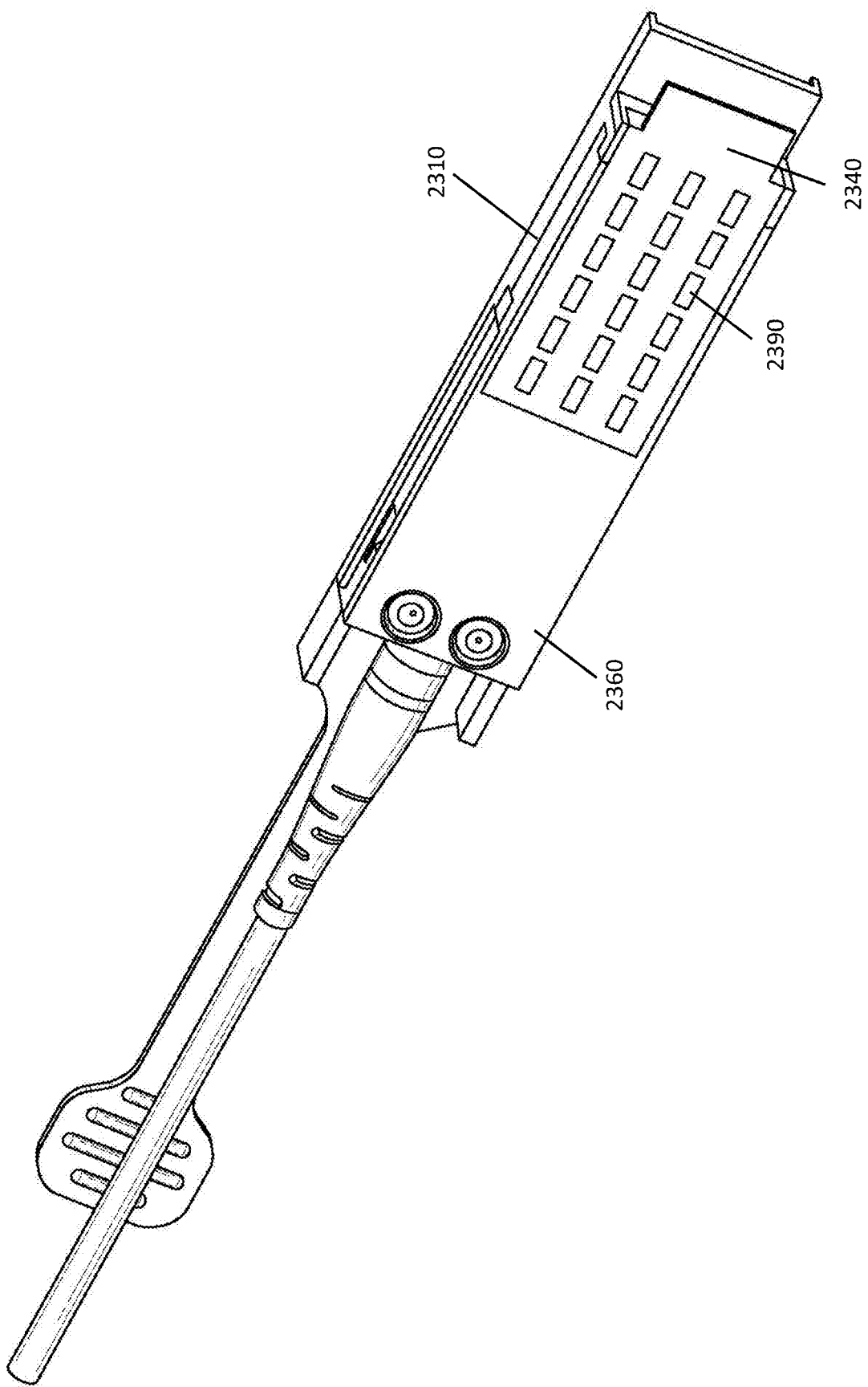
FIG. 23 is a perspective view of a transceiver according to a preferred embodiment of the present invention.
Figure 24:
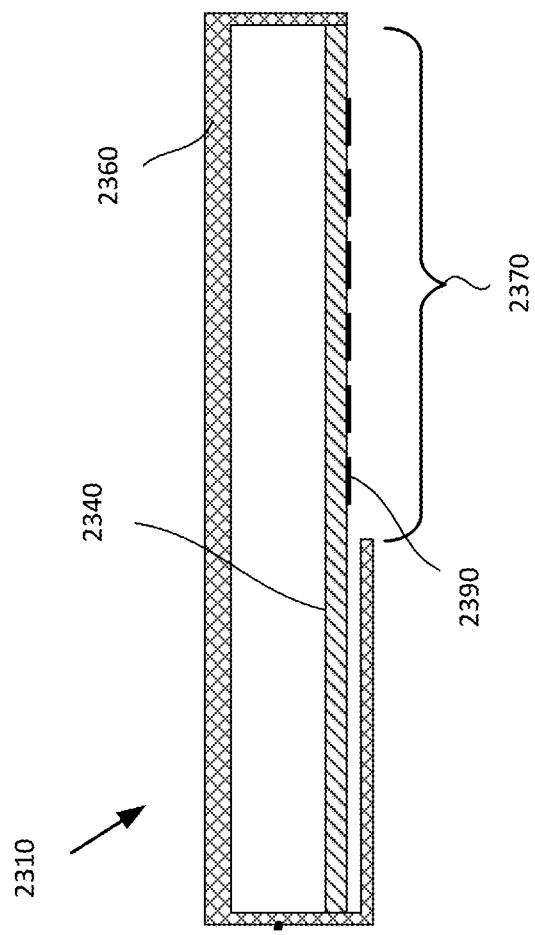
FIG. 24 is a sectional schematic view of a transceiver according to a preferred embodiment of the present invention.

As shown in FIGS. 23 and 24, instead of having contact pads 2390 on the top and bottom of the transceiver PCB 2340, the bottom of the transceiver housing 2360 includes an opening or cut-out region 2370 that exposes contact pads 2390 on the bottom of the transceiver PCB 2340. As shown in FIG. 23, an exposed portion of the bottom of the transceiver PCB2340 can be larger than the exposed portion of the transceiver PCB 740 in FIG. 7. The exposed portion of the transceiver PCB 2340 where the contacts are located allows more flexibility in the number of rows and columns of contact pads 2390, which in turn allows the transceiver width and length to be tailored to specific applications. The end of the transceiver that is inserted into the cage can be open as shown in FIG. 23 or can be closed as shown in 24.

When the transceiver 2310 of FIG. 23 is inserted into an opening in the cage, the contacts of the compression connector make mechanical contact and provide an electrical connection with the contact pads 2390 on the transceiver PCB 2340. The contacts are deformable and bend downward when the transceiver 2310 is inserted into the cage.

Figure 25:
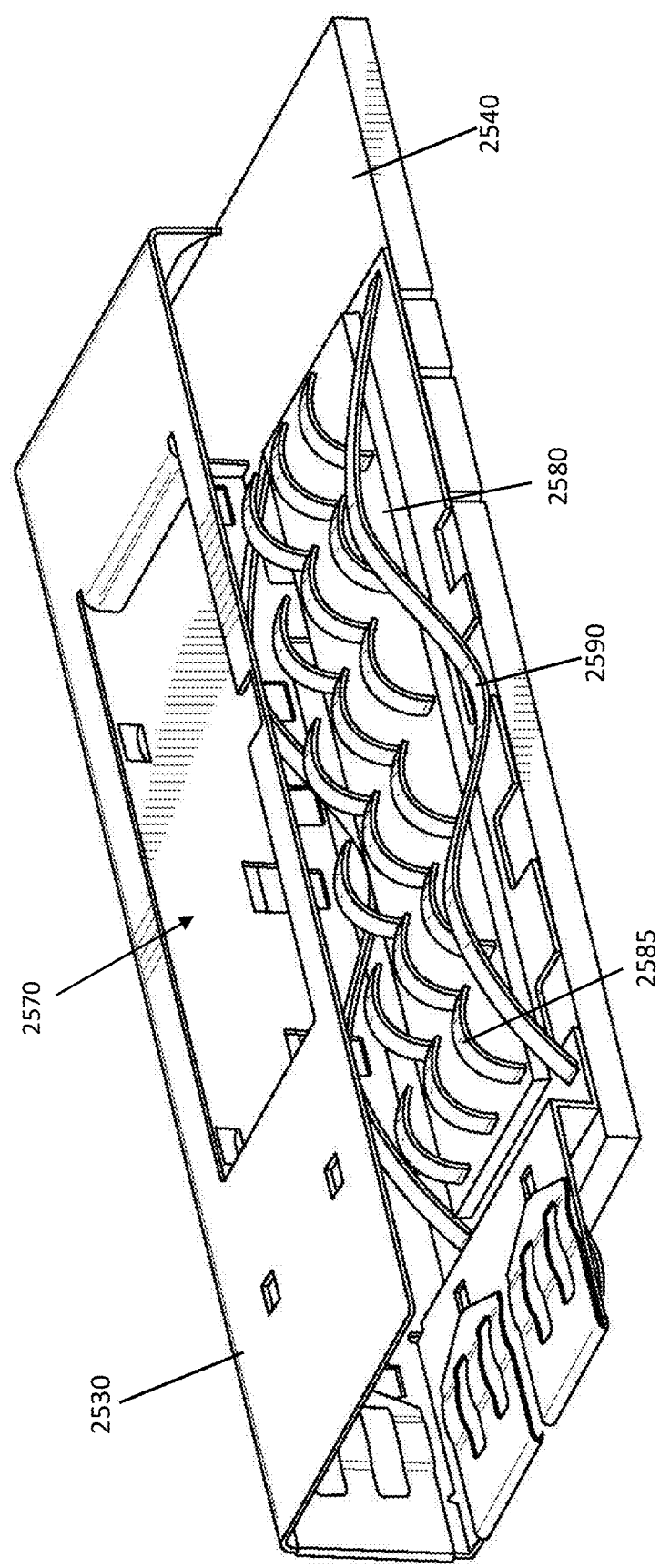
FIG. 25 is a perspective sectional view of a cage assembly according to a preferred embodiment of the present invention.

FIG. 25 is a perspective sectional view of a cage assembly according to a preferred embodiment that shows this aspect of the present invention. FIG. 25 shows a cage 2530 attached to a PCB 2540. As shown, the cage 2530 can include a compression connector 2580 that includes curled contacts 2585. The cage 2530 can also include a spring or springs 2590 that are shown between the compression connector 2580 sides wall of the cage 2530. An opening 2570 is also shown at the top of the case 2530 used for a heat exchanger, as discussed above.

Figure 26:
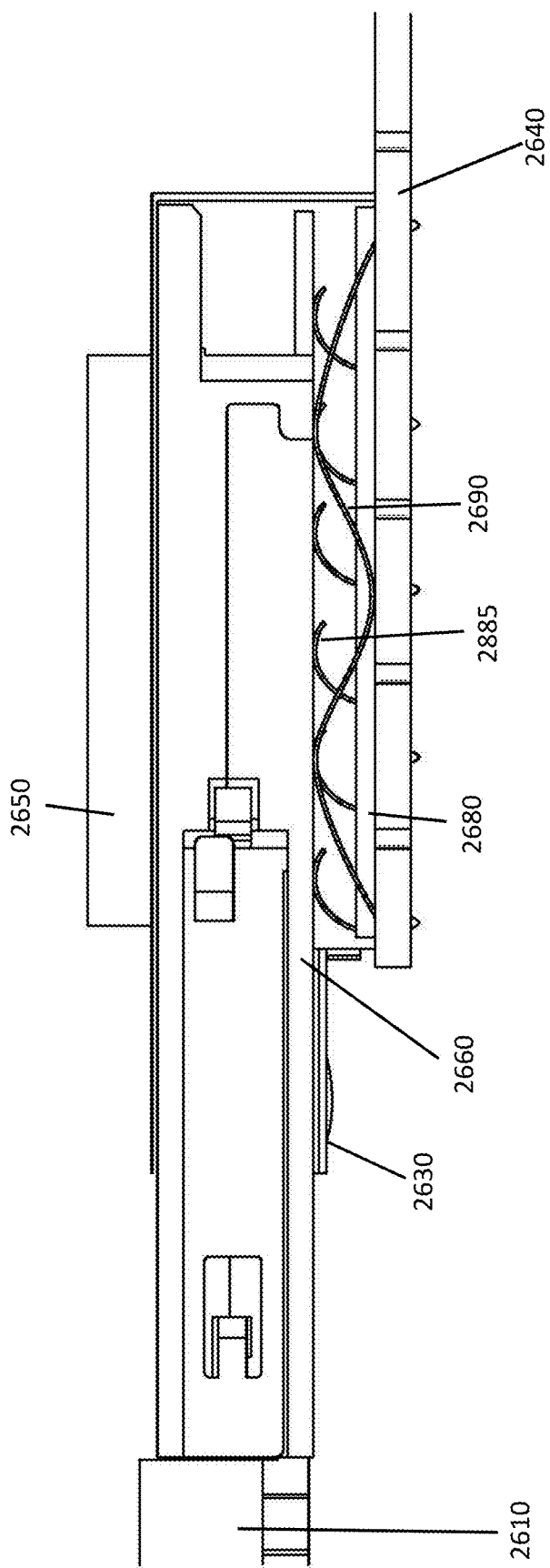
FIG. 26 is a sectional view of a transceiver assembly according to a preferred embodiment of the present invention.

FIG. 26 is a sectional view of a transceiver assembly according to a preferred embodiment of the present invention. FIG. 26 shows a transceiver 2610 inserted into a cage 2630 similar to that shown in FIG. 25 that is mounted to a PCB 2640. In addition to having contact pads that make contact with the contacts 2685 of the compression connector 2680, the transceiver PCB can have rails that make contact with the springs 2690 shown in FIG. 26 when the transceiver 2610 is inserted into the cage 2630. The rails can also be located on the transceiver housing 2660. The rails can provide an electrical grounding path to the transceiver 2610. FIG. 26 also shows a heat exchanger 2650 on top of the cage 2630.

With the preferred embodiments shown in FIGS. 23-26, the contacts of the compression connector can be physically and electrically connected to the contact pads on the transceiver PCB. The contact pads on the transceiver PCB can be arranged only on the bottom surface of the transceiver PCB. The contacts of the compression connector can transport high-speed electrical signals, low-speed control signals, and power between the transceiver and the PCB without going through an intermediate PCB. The compression connector provides a direct electrical connection between the PCB and the transceiver, which allows signals and power to be transported between the PCB and the transceiver without using the jumper cables shown, for example, in FIGS. 8 and 9. In applications in which cables are desirable, it is possible to directly connect cables to the compression connector. Alternatively, it is possible to mount a first cable connector, such as a direct attach connector or a compression connector, of a cable assembly to the PCB next to the cage. The cable assembly can include a second cable connector that can be mounted at a different location on the PCB or elsewhere. The compression connector can be connected to the PCB in any suitable manner, including using surface-mount technology (SMT), land grid array (LGA), ball grid array (BGA), press fit, through hole, etc. The contacts in the compression connector can be arranged in an array corresponding to an array of contact pads on the bottom of the transceiver PCB. The cage surrounds the compression connector and is fixed with respect to the PCB. When the transceiver is inserted into the cage, the transceiver floats with respect to both the cage and the PCB in a direction between the top and bottom of the cage, i.e., perpendicular or substantially perpendicular within manufacturing tolerances to the top surface of the PCB. Because both the top of the cage and a bottom surface of the heat exchanger are static or fixed or are designed to not move with respect to each other, the datum plane of the bottom surface of the heat exchanger is static or fixed. The top of the cage and/or the heat exchanger provide a rigid surface against which the transceiver is pushed.

Figure 27:
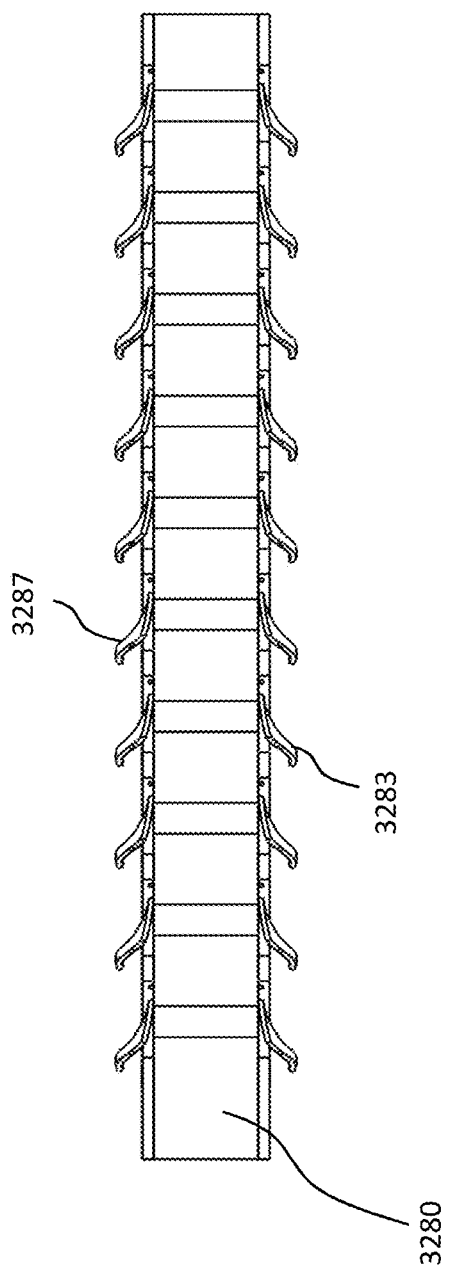
FIG. 27 is a sectional view of an interposer that can be used with the transceiver assemblies of preferred embodiments of the present invention.
Figure 32:
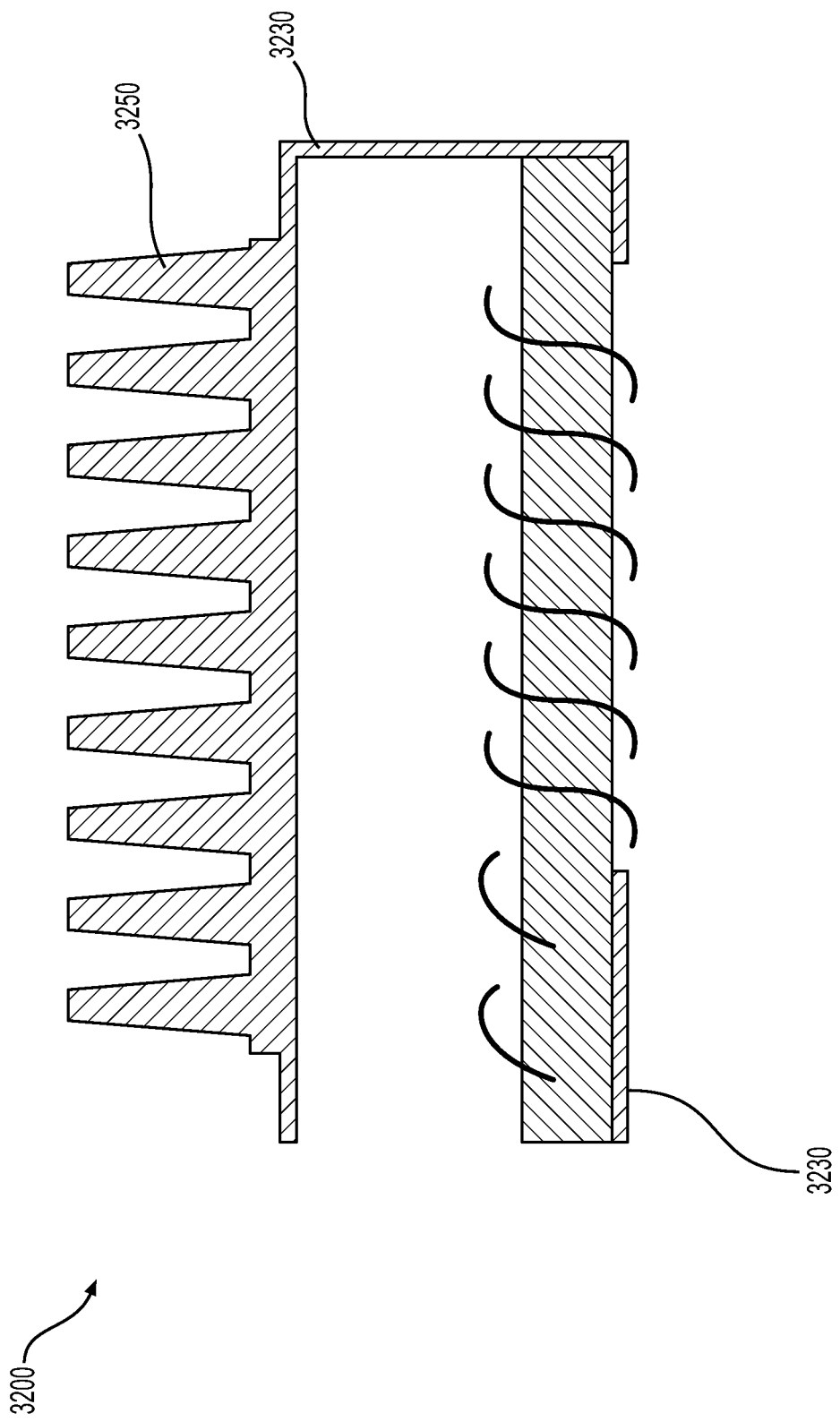

The compression connector can, for example, include an interposer 3280 with an array of contacts on both sides of the interposer 3280, as shown in FIG. 32. The contacts on the interposer can include dual compression contacts in which top contacts 3287 and bottom contacts 3283 extend from both sides of the interposer 3280 as shown in FIG. 27 or can include compression contacts on one side of the interposer 3280 and solder balls, press fit pins, etc. on the other side of the interposer (not shown). If dual compression contacts are used, then the bottom contacts 3283 can be connected to corresponding contact pads on the PCB. If solder balls are used, then the compression contacts can be soldered to corresponding contact pads on the PCB.

FIGS. 25 and 26 show springs that compress when a transceiver is inserted into the cage. Although wave springs are shown in FIGS. 25 and 26, other springs could also be used. Although in FIGS. 26 and 26, two springs are located within the cage adjacent to the cage walls, any number of springs and any locations for the springs could be used. In FIGS. 25 and 26, the springs are connected to the cage, but the springs could also be connected to the transceiver or the compression connector.

The springs and the contacts of the compression connector provide a normal force within a predetermined range that presses up against the transceiver, toward the top opening of the cage and the heat exchanger extending through the opening. The normal force is perpendicular or substantially perpendicular to the transceiver-insertion direction (where the transceiver-insertion direction is parallel or substantially parallel within manufacturing tolerances to the top surface of the PCB) and toward the top of the cage. The transceiver can be biased toward the top of the cage without having to use any fasteners or other external hardware. The contacts of the compression connector provide a normal force that presses up against the transceiver and provide an electrical path to transport signals and power between the transceiver and the PCB. The normal force pushing the top of the transceiver housing against the bottom of the heat exchanger provides mechanical contact between the transceiver housing and the heat exchanger, and thus providing a continuous conductive heat transfer path for heat flow from the transceiver housing to the heat exchanger. A low impedance thermal path is provided between the transceiver housing and the heat exchanger, helping to dissipate heat generated in the transceiver. The heat exchanger can be an active heat exchanger or a passive heat exchanger. For example, the heat exchanger can be a cold plate that uses a cooling fluid, such as water, to remove heat. Alternatively, the heat exchanger can use convective air flowing past an array of fins or some other type of extended surface. The heat exchanger can also be a heat pipe that provides a low impedance thermal path away from a region adjacent the transceiver.

Figure 28:
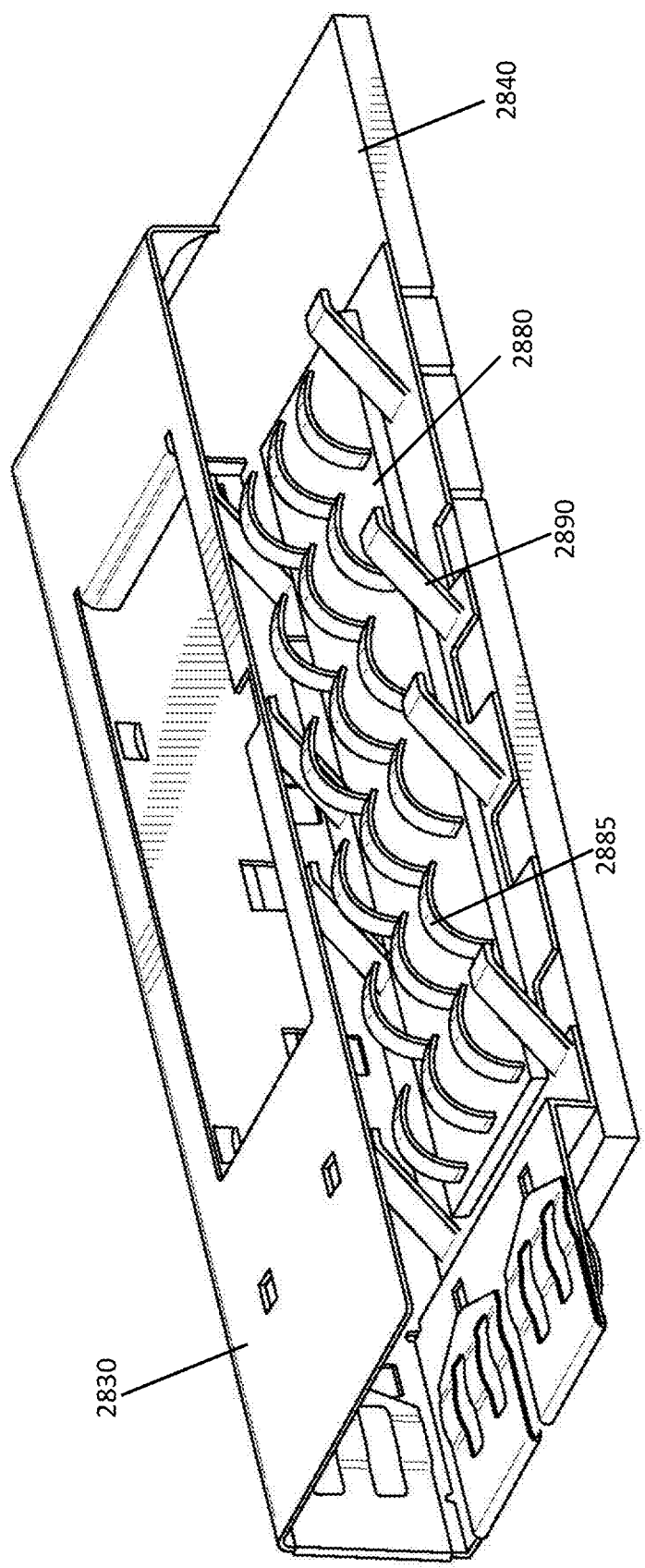
FIG. 28 is a perspective sectional view of a cage assembly according to a preferred embodiment of the present invention.

FIG. 28 is a perspective sectional view of a cage assembly according to another preferred embodiment of the present invention. FIG. 28 shows a cage 2830 attached to a PCB 2840. As shown, the cage 2830 can include a compression connector 2880 that includes curled contacts 2885. The cage 2530 can also include arms 2890 that are shown between the compression connector 2880 sides wall of the cage 2830.

Figure 29:
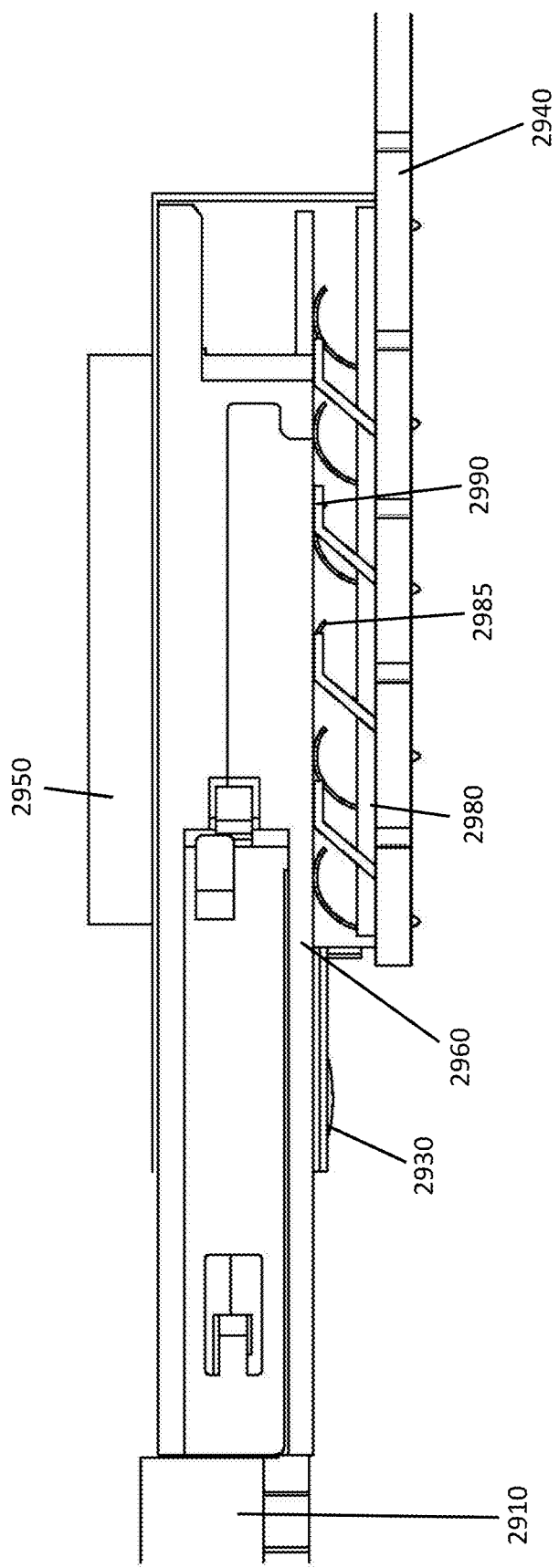
FIG. 29 is a sectional view of a transceiver assembly according to a preferred embodiment of the present invention.

FIG. 29 is a sectional view of a transceiver assembly according to another preferred embodiment of the present invention. FIG. 29 shows a transceiver 2910 inserted into a cage 2930 that is mounted to a PCB 2940. FIG. 29 shows contacts 2985 of a compression connector 2980 that make contact with contacts pads on the transceiver 2910 when the transceiver 2910 is inserted into the cage 2630. Instead of springs, FIG. 29 shows that arms 2890 can contact a bottom of the transceiver housing 2690. FIG. 26 also shows a heat exchanger 2650 on top of the cage 2630.

Thus, as shown in FIGS. 28 and 29, cantilevered arms can be used instead of springs. However, any suitable elastically deformable element or feature that can provide a normal force on the transceiver can be used instead of the springs and the cantilevered arms. The transceiver and the cage assembly can be configured so that that normal force is applied to the transceiver only near or at the end of the transceiver's travel into the cage. For example, a lever or inclined plane can be used to help provide this normal force.

Figure 30:
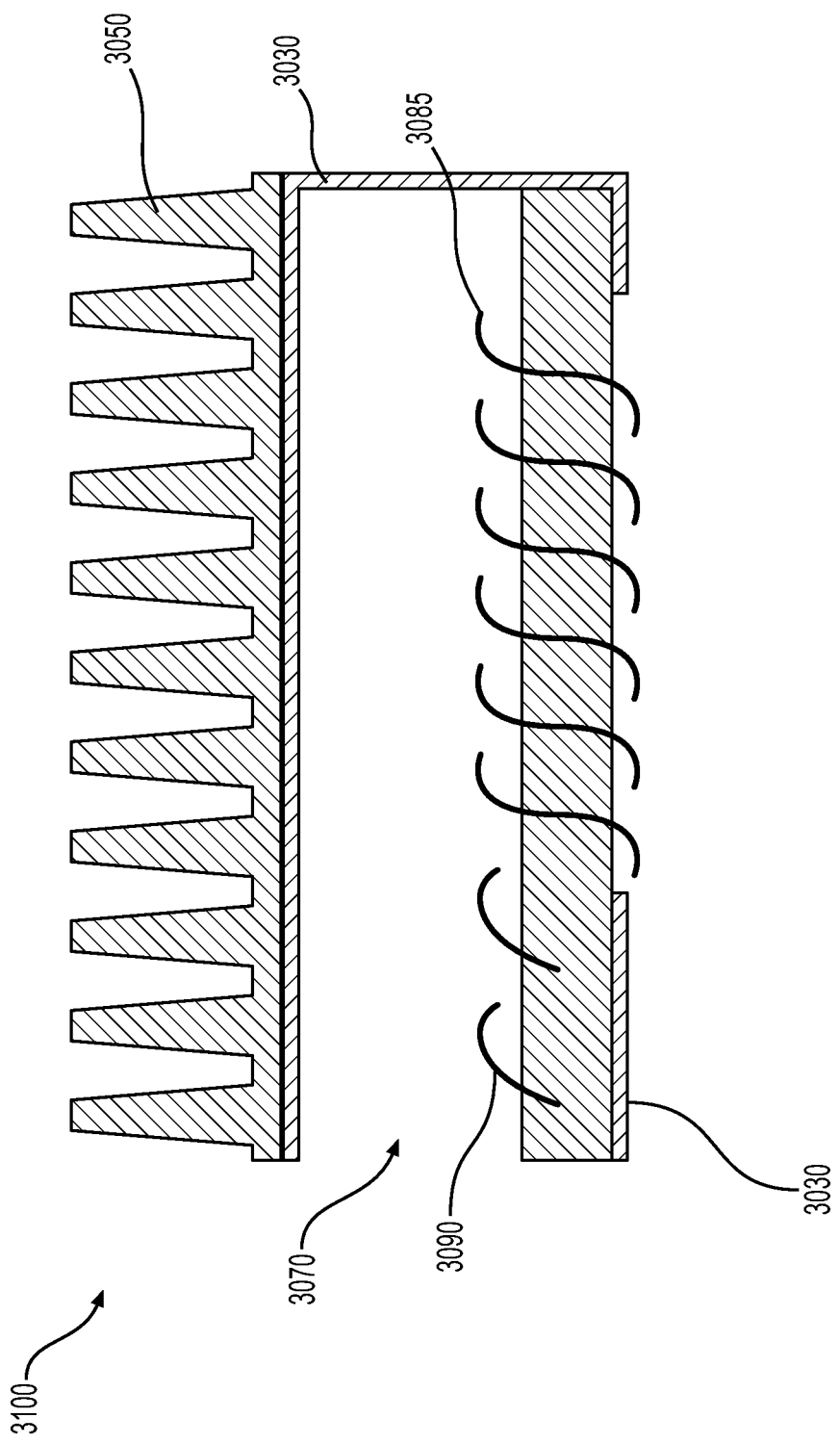
FIG. 30-32 are sectional schematic views of cage assemblies according to preferred embodiments of the present invention.
Figure 31:
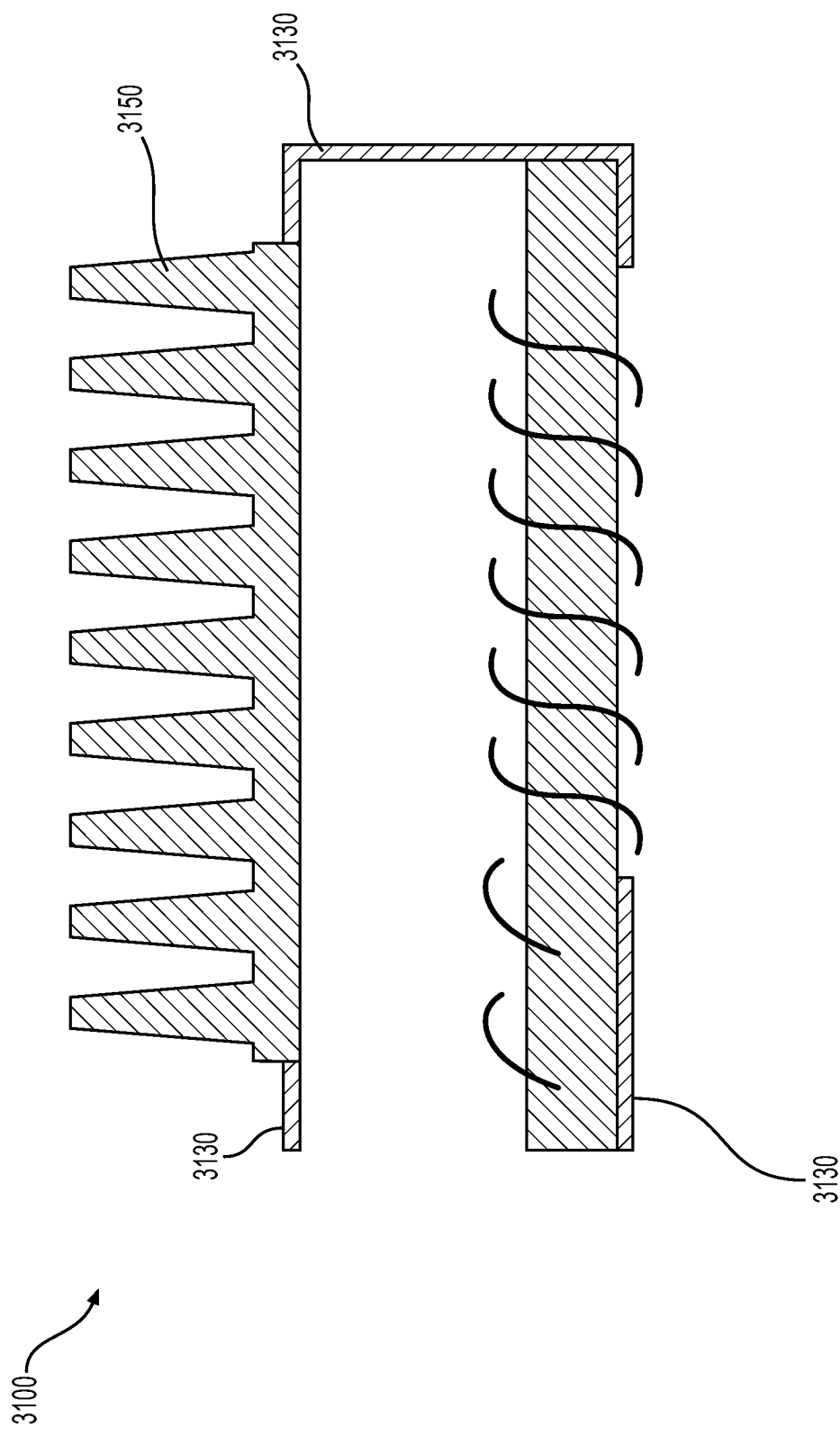

It is also possible to use different arrangements of the heat exchanger. FIGS. 30-32 show different possible arrangements for the heat exchanger in sectional side views of the cage assemblies. Although a heatsink is shown in FIGS. 30-32, other heat exchangers could also be used, as discussed above.

FIG. 30 shows a cage assembly 3000 including a cage 3030, a compression connector 3080 with contacts 3085, and spring 3090. The cage 3030 also includes an opening 3070 in which a transceiver is inserted and springs 3090 that force the inserted transceiver toward a heatsink 3050. As shown in FIG. 30, a lower surface of the heatsink 3050 can be mounted against an upper surface of the cage 3030. But other arrangements are possible.

For example, FIG. 31 shows a cage assembly 3100 including a cage 3130. However, in FIG. 31, the cage 3130 has an opening in the top wall and a heatsink 3150 is inserted into this opening, which allows direct mechanical contact between the transceiver housing and the heatsink 3150 when the transceiver is inserted into the cage 3130. Because of the opening in the top of the cage 3130, the thermal path between the transceiver and the heatsink 3150 is more direct because heat does not need to be transmitted through the top wall of the cage 3130.

Additionally, FIG. 32 shows a cage assembly 3200 including a cage 3230. However, in FIG. 32, the cage 3230 and a heatsink 3250 are defined in a unitary structure, i.e., the cage 3230 and the heatsink 3250 define a single monolithic structure, which could, for example, be made by die casting or molding. With a unitary structure, fewer separate pieces are required in the cage assembly 3200.

Because much of the bottom of the transceiver PCB can be exposed and populated with contact pads, the transceiver such as that shown in FIG. 23 can have many more electrical connections than the transceiver in FIG. 7 that only includes electrical connections along the front edge of the transceiver PCB 740. The electrical path for high-speed signals between the transceiver PCB and the PCB can be very short. The high-speed signals can propagate only through the transceiver PCB and make short lateral runs because the O-E and E-O components can be located directly above the contact pads on the transceiver PCB. Because the transceiver PCB is located near the bottom of the transceiver housing, there is more room above the transceiver PCB for components, or a thinner transceiver can be provided. As shown in FIGS. 26 and 29, the transceiver can experience an insertion force from the friction created between the transceiver and the cage and/or between the transceiver and the heat exchanger by the compression connector forcing the transceiver toward the top of the cage and/or the heat exchanger.

Figure 33:
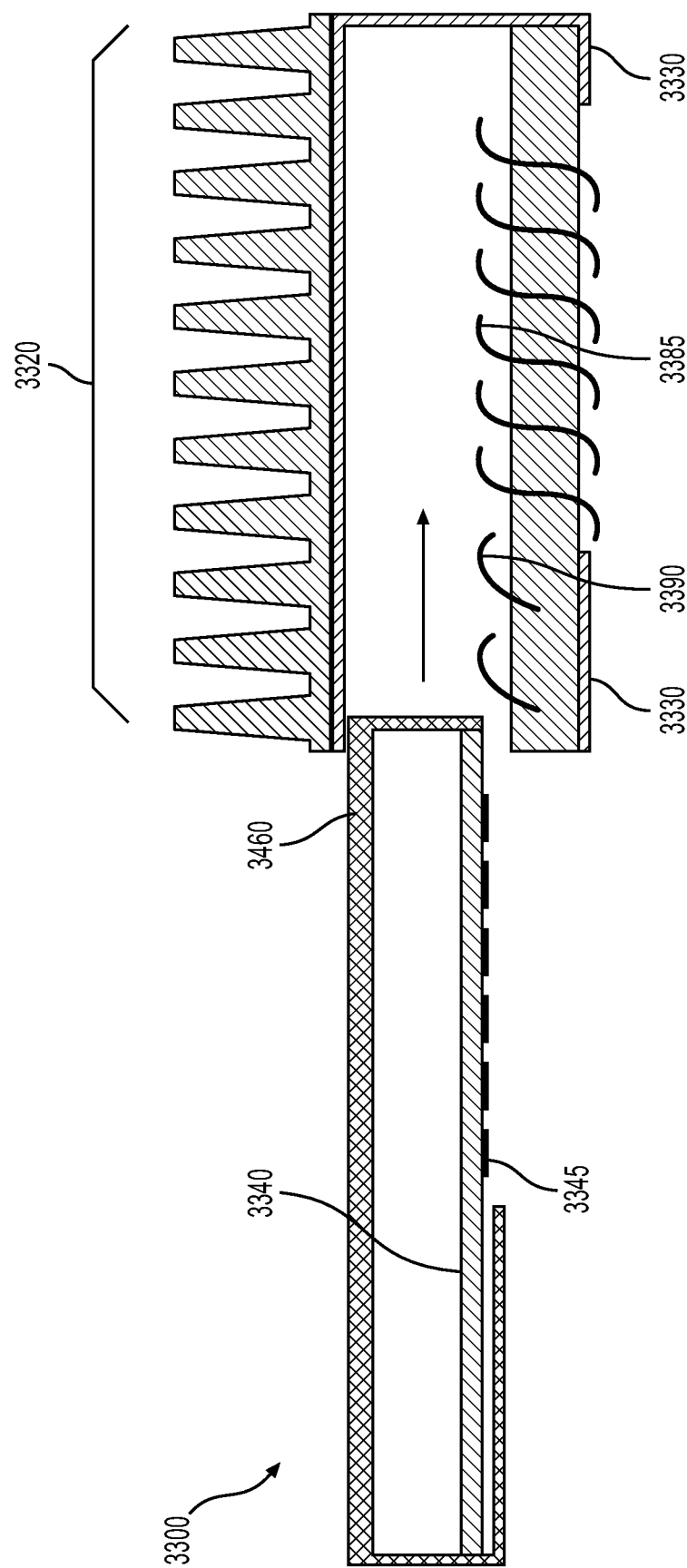
FIGS. 33 and 34 are sectional views of a transceiver assembly according to a preferred embodiment of the present invention.
Figure 34:
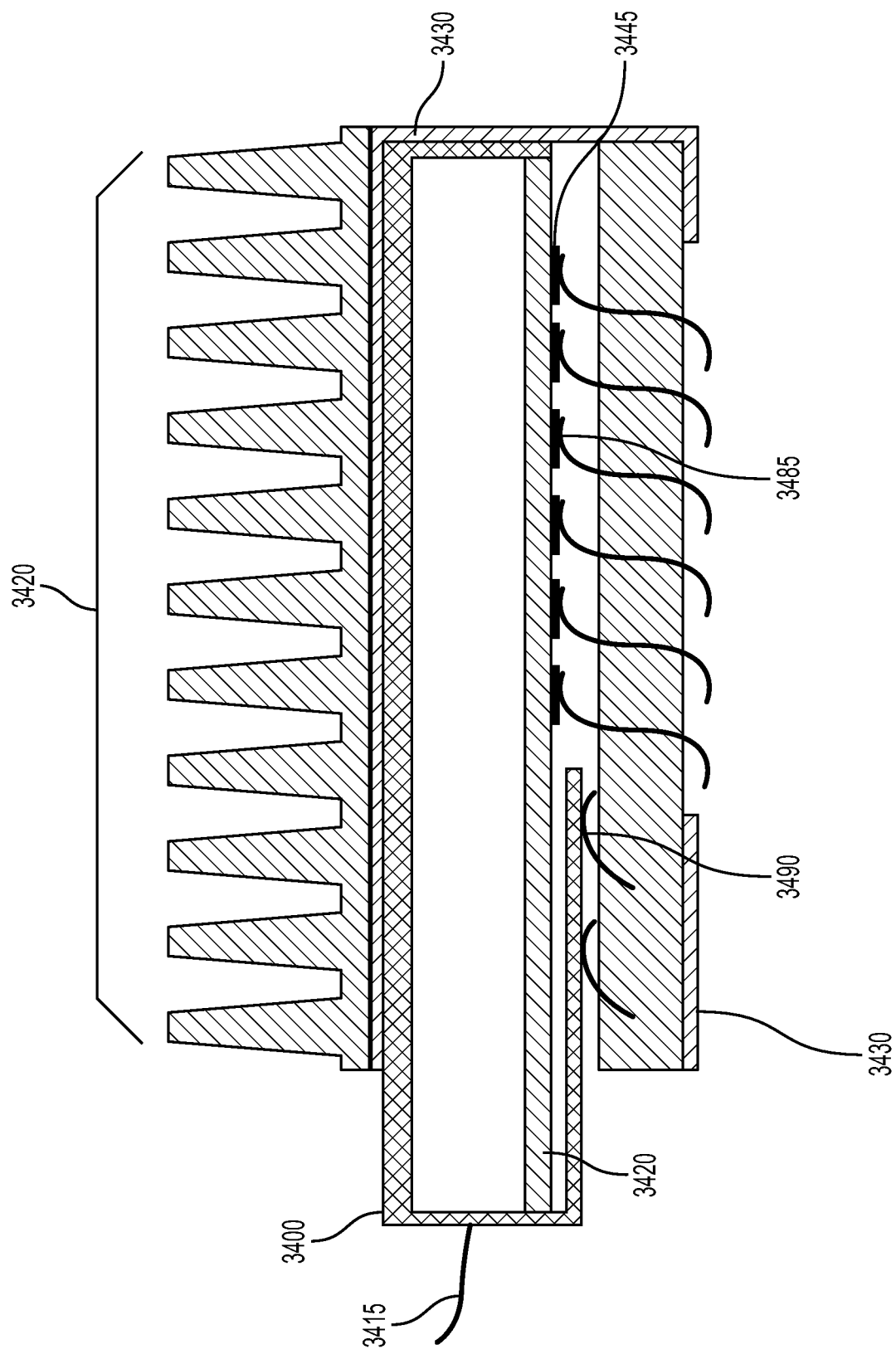

FIGS. 33 and 34 show a transceiver as it is inserted into a cage assembly according to a preferred embodiment of the present invention. In FIG. 33, the transceiver 3300 is shown before it is inserted into the cage assembly 3320 in the direction of the bold arrow. In FIG. 34, the transceiver 3400 has been inserted into the cage assembly 3420. The transceiver can be similar to the transceiver shown in FIG. 24, and the cage assembly can be similar to any of the cage assemblies shown in FIGS. 30-32. The cage assembly most similar to that of FIG. 30 is shown in FIGS. 33 and 34.

FIG. 33 shows the transceiver assembly 3300 including a transceiver PCB 3340, contact pads 3345 on the transceiver PCB 3340, and a transceiver housing 3460. The cage assembly 3320 includes the cage 3330, compression contacts 3385, and springs 3390.

FIG. 34 shows the transceiver assembly 3400 fully engaged with the cage assembly 3420. As the transceiver 3400 is inserted into the cage assembly 3430, the springs 3490 and the compression contacts 3485 supported by a contact block, which can be an electrically insulative portion of the compression connector shown, for example, in FIGS. 28 and 30, can deflect downward to provide a normal force pushing the transceiver 3400 up against the top of the cage 3430 and adjacent heatsink. As shown in FIGS. 30-34, the contact block can extend to the opening of the cage through which the transceiver is inserted, which can help in inserting the transceiver into the cage. The transceiver can be removed from the cage assembly by pulling the transceiver in a direction opposite to the insertion direction. Various latching mechanisms (not shown) can help ensure that the transceiver does not become accidentally disengaged from the cage assembly once it is inserted.

FIG. 34 shows the transceiver 3400 fully inserted into the cage assembly 3420. No portion of the cage 3430 or other structure is inserted into the transceiver housing when the transceiver 3400 is inserted into the cage 3420. This is true even if the transceiver 3400 has an open end as shown in FIG. 23. The compression contacts 3485 are deformed downward so that the contacts make mechanical and electrical contact with contact pads 3445 on the bottom of the transceiver PCB 3440. The contacts 3485 can be supported by a contact block or more generally an electrical insulating portion of a compression connector. The contacts pads 3445 can be used to transport high-speed electrical signals, low-speed control signals, and electrical power to and from the transceiver 3400. In the transceiver 3400, incoming optical signals on the optical fiber can be transformed to outgoing electrical signals on the contact pads 3445. Similarly, incoming electrical signals on the contact pads 3445 can be transformed to outgoing optical signals on the optical fiber 3415. Optical signals can enter and/or exit the transceiver 3400 via the optical fiber 3415.

As mentioned above, the same heat exchanger can extend over multiple cages because, in each cage, the transceiver is pushed up against the top of the cage. With this arrangement, the peak heat generation in any transceiver can be higher than the average heat generation because the heat exchanger is shared among the transceivers mounted in adjacent cages.

Figure 35:
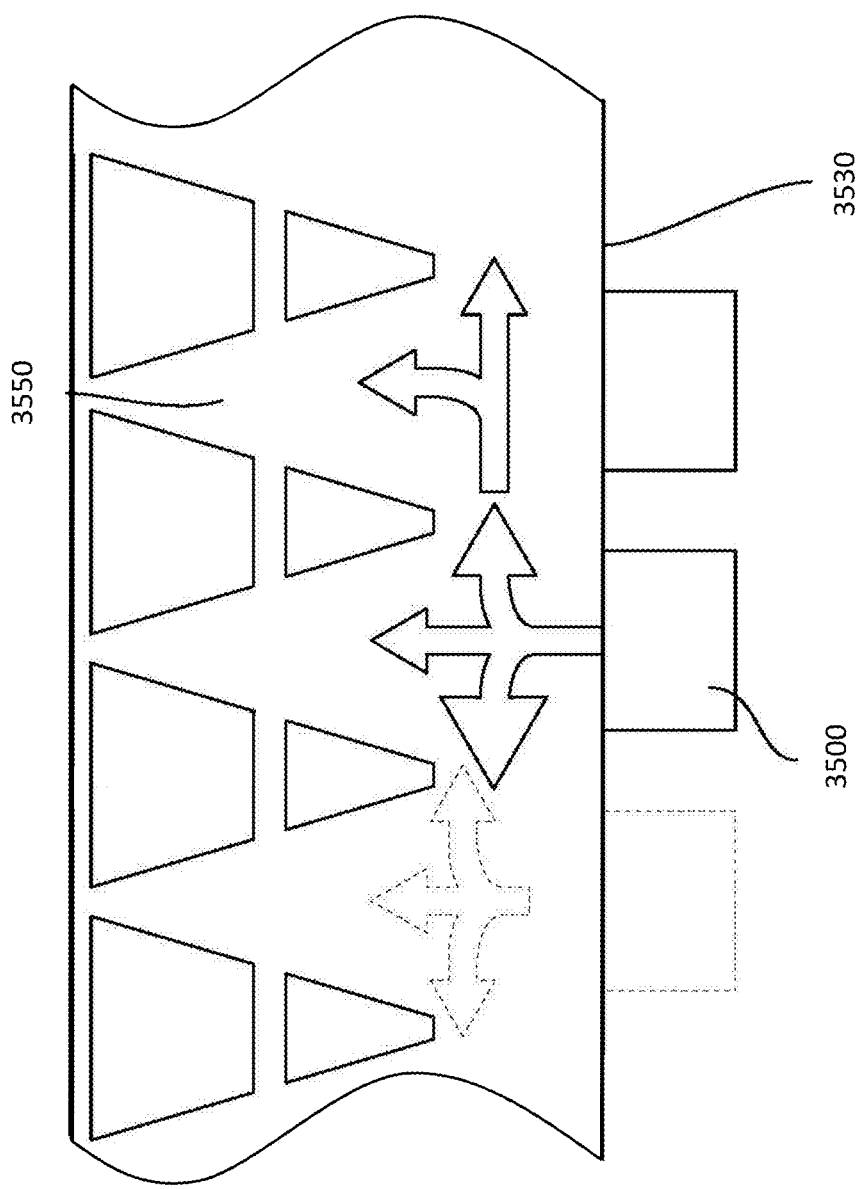
FIG. 35 is a diagram of heat flow of a heat exchanger that can be used with cage assemblies according to preferred embodiments of the present invention.

Optionally, the heat exchanger can extend to and be incorporated into the front bezel of rack-mountable equipment so that there is a continuous air flow path from the front of the rack across the cage. The air flow path can be in any direction, i.e. front-to-back, back-to-front, or side-to-side. The heat exchanger can have more conductive material adjacent to the transceiver and less conductive material farther away from the transceiver where less heat will be dissipated as illustrated in FIG. 35. FIG. 35 shows heat flow, represented by the wide arrows, from a transceiver 3500 in a heat sink 3350 located at the top of a cage 3530.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:
1. A cage assembly comprising:
a cage including a top wall and a bottom wall;
an electrical receptacle that is separate from the cage and that is positioned between the top wall and the bottom wall such that the electrical receptacle floats within the cage in opposite directions between the top wall and the bottom wall; and
a compression connector electrically connected to the electrical receptacle, the compression connector including signal contacts that provide a normal force that pushes the electrical receptacle towards the top wall.

2. The cage assembly of claim 1, further comprising an intermediate substrate on which the electrical receptacle is mounted; wherein
   the intermediate substrate floats within the cage in the opposite directions between the top wall and the bottom wall.

3. The cage assembly of claim 2, further comprising arms extending from the bottom wall; wherein
   at least one of the arms is engageable with a bottom surface of a transceiver when the transceiver is inserted into the cage assembly, and at least another one of the arms is engageable with a bottom surface of the intermediate substrate.

4. The cage assembly of claim 1, further comprising a heat exchanger fixed to the top wall of the cage; wherein
   a top surface of a transceiver is biased towards a bottom surface of the heat exchanger when the transceiver is inserted into the cage assembly.

5. The cage assembly of claim 4, wherein the top surface of the transceiver contacts the bottom surface of the heat exchanger through an opening in the cage when the transceiver is inserted into the cage assembly.

6. The cage assembly of claim 2, wherein the signal contacts contact a bottom of the intermediate substrate.

7. The cage assembly of claim 2, wherein the cage includes a stop that engages the intermediate substrate to ensure that at least one of the signal contacts of the compression connector maintains electrical connection to the intermediate substrate.

8. The cage assembly of claim 2, wherein the cage includes at least one guide that allows the electrical receptacle to float in the opposite directions between the top wall and the bottom wall.

9. The cage assembly of claim 8, wherein the at least one guide engages with a groove in the intermediate substrate.

10. The cage assembly of claim 8, further comprising a grommet that connects cables to the electrical receptacle; wherein
    the at least one guide engages with a slot in the grommet.

11. The cage assembly of claim 1, further comprising cables connected to the electrical receptacle.

12. A cage assembly comprising:
    a cage including a top wall and a bottom wall;
    an electrical receptacle configured to receive a transceiver and positioned between the top wall and the bottom wall such that the electrical receptacle floats within the cage in opposite directions between the top wall and the bottom wall;
    an intermediate substrate on which the electrical receptacle is mounted; and
    a heat exchanger fixed to the top wall of the cage; wherein
    the intermediate substrate floats with the electrical receptacle within the cage in the opposite directions between the top wall and the bottom wall;
    when the transceiver is inserted into the cage assembly, a top surface of the transceiver is biased towards a bottom surface of the heat exchanger and contacts the bottom surface of the heat exchanger through an opening in the cage.

13. The cage assembly of claim 12, further comprising a compression connector that includes signal contacts that contact a bottom of the intermediate substrate.

14. The cage assembly of claim 12, further comprising arms extending from the bottom wall; wherein
    at least one of the arms is engageable with a bottom surface of the transceiver when the transceiver is inserted into the cage assembly, and at least another one of the arms is engageable with a bottom surface of the intermediate substrate.

15. The cage assembly of claim 13, wherein the cage includes a stop that engages the intermediate substrate to ensure that at least one of the signal contacts of the compression connector maintains electrical connection to the intermediate substrate.

16. The cage assembly of claim 12, wherein the cage includes at least one guide that allows the electrical receptacle to float in the opposite directions between the top wall and the bottom wall.

17. The cage assembly of claim 16, wherein the at least one guide engages with a groove in the intermediate substrate.

18. The cage assembly of claim 16, further comprising a grommet that connects cables to the electrical receptacle; wherein
    the at least one guide engages with a slot in the grommet.

19. The cage assembly of claim 12, further comprising cables connected to the electrical receptacle.

20. An electrical connector comprising:
    a compression connector including signal contacts;
    a printed circuit board (PCB) electrically connected to the compression connector; and
    a receptacle connector electrically connected to the compression connector and to the PCB; wherein
    the receptacle connector is mounted to the PCB such that the PCB and the receptacle connector move together in first and second directions; and
    both the PCB and the receptacle connector are biased by the signal contacts of the compression connector in the first direction.

* * * * *